US011790510B2

(12) United States Patent
Stoppe et al.

(10) Patent No.: US 11,790,510 B2
(45) Date of Patent: Oct. 17, 2023

(54) MATERIAL TESTING OF OPTICAL TEST PIECES

(71) Applicant: Carl Zeiss Jena GmbH, Jena (DE)

(72) Inventors: Lars Stoppe, Jena (DE); Niklas Mevenkamp, Jena (DE); Alexander Freytag, Erfurt (DE)

(73) Assignee: Carl Zeiss Jena GmbH, Jena (DE)

( * ) Notice: Subject to any disclaimer, the term of this patent is extended or adjusted under 35 U.S.C. 154(b) by 364 days.

(21) Appl. No.: 17/251,415

(22) PCT Filed: Jun. 6, 2019

(86) PCT No.: PCT/EP2019/064759
§ 371 (c)(1),
(2) Date: Dec. 11, 2020

(87) PCT Pub. No.: WO2019/238518
PCT Pub. Date: Dec. 19, 2019

(65) Prior Publication Data
US 2021/0279858 A1    Sep. 9, 2021

(30) Foreign Application Priority Data

Jun. 12, 2018  (DE) .......................... 102018114005.3

(51) Int. Cl.
*G06T 7/00* (2017.01)
*G06T 7/70* (2017.01)
(Continued)

(52) U.S. Cl.
CPC ....... *G06T 7/0004* (2013.01); *G01M 11/0221* (2013.01); *G01M 11/0264* (2013.01);
(Continued)

(58) Field of Classification Search
CPC ......... G06T 7/0004; G06T 5/007; G06T 5/50; G06T 7/70; G06T 2207/10152;
(Continued)

(56) References Cited

U.S. PATENT DOCUMENTS 10,089,733 B2    10/2018  Seidel
10,551,369 B2     2/2020  Engel
(Continued)

FOREIGN PATENT DOCUMENTS

DE    19914115 A1    11/1999
DE    19739250 C2     1/2003
(Continued)

OTHER PUBLICATIONS

International Search Report from corresponding International Patent Application No. PCT/EP2019/064759, dated Jan. 24, 2020.
(Continued)

*Primary Examiner* — Bobbak Safaipour
(74) *Attorney, Agent, or Firm* — KUSNER & JAFFE

(57) ABSTRACT

The invention relates to techniques for material testing of optical test pieces, for example of lenses. Angle-variable illumination, using a suitable illumination module, and/or angle-variable detection are carried out in order to create a digital contrast. The digital contrast can be, for example, a digital phase contrast. A defect detection algorithm for automated material testing based on a result image with digital contrast can be used. For example, an artificial neural network can be used.

22 Claims, 13 Drawing Sheets

(51) Int. Cl.
*G01M 11/02* (2006.01)
*G06T 5/00* (2006.01)
*G06T 5/50* (2006.01)

(52) U.S. Cl.
CPC ......... *G01M 11/0278* (2013.01); *G06T 5/007* (2013.01); *G06T 5/50* (2013.01); *G06T 7/70* (2017.01); *G06T 2207/10152* (2013.01); *G06T 2207/20081* (2013.01); *G06T 2207/20084* (2013.01)

(58) Field of Classification Search
CPC ........... G06T 2207/20081; G06T 2207/20084; G01M 11/0221; G01M 11/0264; G01M 11/0278
See application file for complete search history.

(56) References Cited

U.S. PATENT DOCUMENTS

| | | | |
|---|---|---|---|
| 2002/0106134 A1 | 8/2002 | Dundon et al. | |
| 2015/0130973 A1* | 5/2015 | Saito | G02B 13/003 359/356 |
| 2015/0355102 A1 | 12/2015 | Kido | |
| 2016/0320603 A1 | 11/2016 | Stoppe et al. | |
| 2017/0069075 A1* | 3/2017 | Okuda | G06V 10/764 |
| 2017/0082555 A1 | 3/2017 | He et al. | |
| 2018/0039058 A1 | 2/2018 | Steinmeyer et al. | |
| 2018/0107928 A1 | 4/2018 | Zhang et al. | |
| 2018/0342050 A1* | 11/2018 | Fitzgerald | G06T 7/0002 |
| 2019/0318469 A1* | 10/2019 | Wang | G06N 3/08 |
| 2020/0195826 A1 | 6/2020 | Seiffert et al. | |

FOREIGN PATENT DOCUMENTS

| | | |
|---|---|---|
| DE | 102015218917 A1 | 3/2017 |
| DE | 102016226206 A1 | 6/2018 |
| EP | 0686842 A2 | 12/1995 |
| EP | 2645146 A1 | 10/2013 |
| EP | 3086286 A1 | 10/2016 |
| EP | 3089105 A1 | 11/2016 |
| EP | 3124959 A1 | 2/2017 |
| EP | 3205528 A1 | 8/2017 |
| WO | WO 2016/174084 A1 | 11/2016 |
| WO | WO 2017/087451 A1 | 5/2017 |
| WO | WO 2017/109053 A2 | 6/2017 |
| WO | WO 2017/200524 A1 | 11/2017 |

OTHER PUBLICATIONS

Milliman et al., "Cosmetic Inspection Guidelines for Mechanical Components," Sep. 30, 2013, pp. 1-26.

* cited by examiner

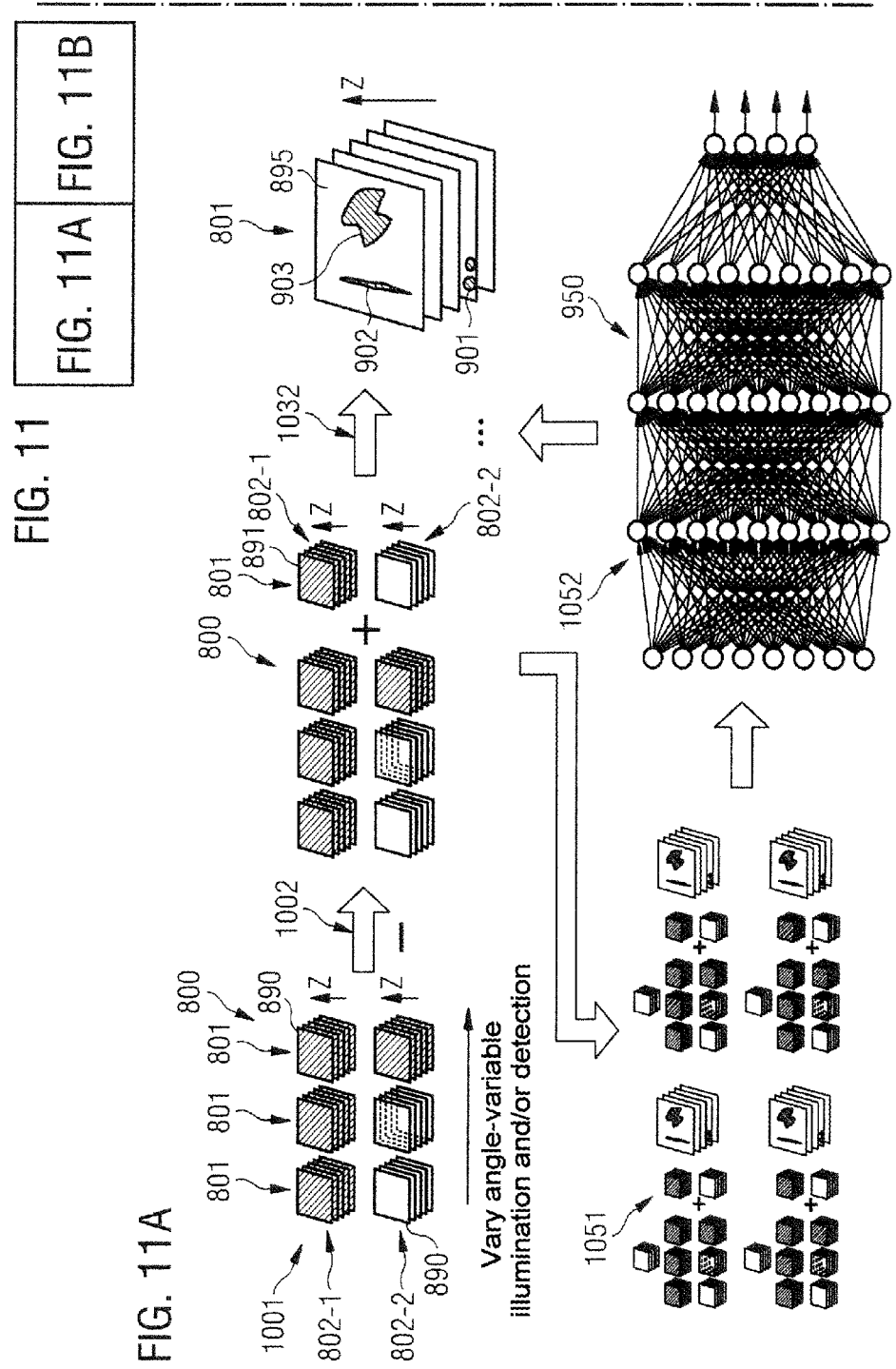

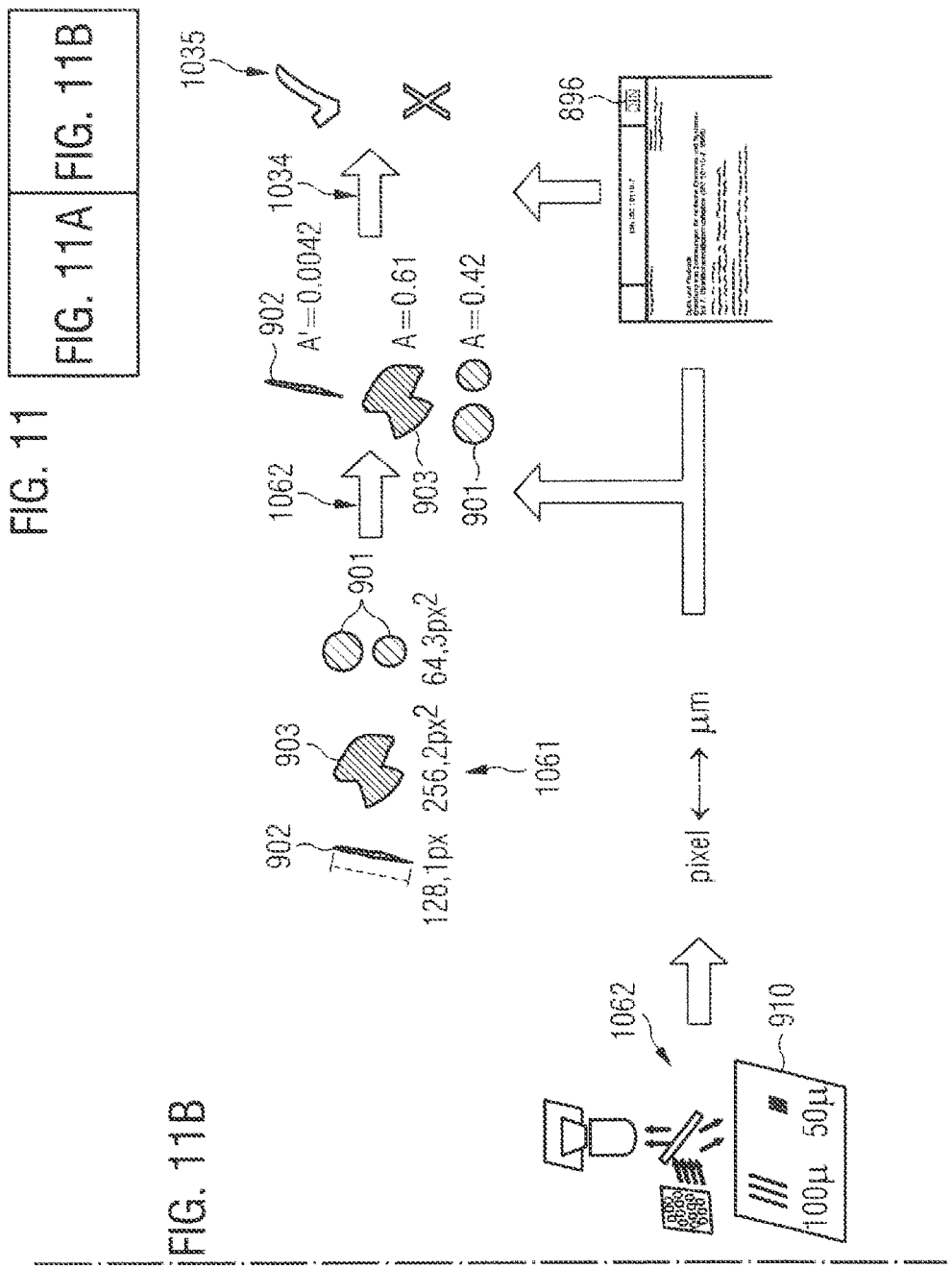

MATERIAL TESTING OF OPTICAL TEST PIECES

FIELD OF THE INVENTION

In general, various embodiments of the invention relate to techniques for material testing of optical test objects. In particular, the various embodiments of the invention relate to techniques for material testing of optical test objects using angle-variable illumination and/or angle-variable detection.

BACKGROUND OF THE INVENTION

Various defects may arise during the production of optical elements—such as lenses. Examples of defects include: scratches; inclusions; material defects; matt surfaces; streaks; flaking; bore errors; optical offset; and turning marks.

Conventionally, optical elements, as test objects, are subjected to a manual visual examination by experts, Typically, special lamps are used in the process in order to make the defects visible. A further technique is the so-called "shape from shading" technique for reconstructing the surfaces in the reflection mode. For instance, the "shape from shading" (SFS) technique is described in Prados, Emmanuel, and Olivier Faugeras. "Shape from shading." Handbook of mathematical models in computer vision (2305):375-388.

However, such reference techniques have certain disadvantages and limitations. By way of example, a manual visual inspection can be comparatively complex. Moreover, obtaining a quantitative quality value may not be possible or only possible to a limited extent.

SFS also has specific disadvantages and limitations. By way of example, it may often be complicated and complex to obtain a sufficiently large number of images for carrying out a reconstruction of the test object. In addition, corresponding techniques can be time-intensive and susceptible to errors.

BRIEF SUMMARY OF THE INVENTION

Therefore, there is a need for improved techniques for material testing of optical test objects. In particular, there is a need for techniques that eliminate or alleviate at least some of the aforementioned limitations and disadvantages.

This object is achieved by the features of the independent patent claims. The features of the dependent patent claims define embodiments.

A method for material testing of optical test objects using an optical imaging system comprises for each of the at least one pose of the test object in relation to the imaging system: respectively actuating the optical imaging system to capture at least two images of the test object by means of angle-variable illumination and/or angle-variable detection. The method also comprises for each of the at least one pose: respectively processing the corresponding at least two images to generate a result image. The result image has a digital contrast. Further, the method comprises carrying out material testing on the basis of the at least one result image which was generated on the basis of the at least two images for the at least one pose.

Here, carrying out the material testing serves to assess the quality of the test object. Optionally, one or more defects of the test object could be detected within the scope of material testing. Then, compliance with an optical standard can be checked on the basis of the defects detected. Detecting individual defects can also be dispensed with in other examples: rather, it may be possible—for example by an algorithm with machine learning such as, for instance, a suitable, trained artificial neural network (ANN)—to directly check the compliance with the optical standard, i.e., without identifying individual defects. Thus, for example, the overall optical effect of the optical test object can be assessed in this context without resolving the influence of individual defects on the overall optical effect. Thus, such an algorithm with machine learning can receive the at least one result image as input. As an output, the algorithm with machine learning can provide a quality value of the test object, for example. By way of example, the quality value could have a binary design, i.e., indicate "pass" or "fail" in the context of compliance or non-compliance with a standard. However, more finely resolved quality values could also be conceivable, for example quality values that quantify the deviation from the standard or quality values that, in addition to "pass" and "fail", also demand a manual visual inspection by way of "uncertain". This can also be referred to as the "red-yellow-green" principle.

As a general rule, the algorithms with artificial intelligence or with machine learning described herein can comprise at least one element of the group of: parametric mapping, a generative model, an anomaly detector, and an ANN. Examples of an ANN comprise a deep neural network (DNN), a time delay neural network, a convolutional neural network (CNN), a recurrent neural network (RNN), a long short-term memory (LSTM) network and a generative model.

The captured images can also be referred to as raw images.

By way of example, the optical test object can be selected from the following group: lens; filter; mirror; prism; etc. Thus, the optical test object can be configured to deflect light, for example to refract or focus light. The optical test object can be produced from glass or a polymer, for example. The optical test object can be at least partly transparent to visible light or infrared light or ultraviolet light. The optical test object can have optical effect, i.e., refract light.

By way of example, the pose of the test object in relation to the imaging system can denote a position and/or an orientation of the test object in a reference coordinate system defined by the imaging system. By way of example, the reference coordinate system could be determined in conjunction with an objective or a detector of the imaging system. By way of example, the pose of the test object can be altered by virtue of the test object being rotated or displaced by translation.

In the case of the angle-variable illumination, the test object can be illuminated by different illumination geometries. By way of example, the test object could be illuminated from different illumination directions. Then, a respective image of the at least two images can be captured when the test object is illuminated by the corresponding illumination geometry. By way of example, an exemplary implementation of the angle-variable illumination is described in: US 2017/276 923 A1. A correspondingly embodied illumination module could be used for the angle-variable illumination. By way of example, use can be made of an illumination module which comprises a multiplicity of light sources. The various light sources are able to be actuated separately. Then, a different illumination geometry can be implemented depending on the active light source or active light sources. If two images that are associated with different illumination geometries are captured, the digital contrast can be determined from a distance of the positions of the imaged representations of the test object in the two images. A further implementation for the illumination module comprises a light source and a mirror arrangement, for example a DMD (digital micromirror device). Then, a different illumination geometry can be activated depending on the position of the various mirrors. An imaged representation of the test object is displaced in the detector plane by the use of different illumination geometries. If two images that are associated with different illumination geometries are captured, the digital contrast can be determined from a distance of the positions of the imaged representations of the test object.

A suitably embodied detection optical unit can be provided in the case of the angle-variable detection. The detection optical unit can be configured to generate an imaged representation of the test object on a detector. Furthermore, provision can be made for an adjustable filter element, which is arranged in an imaging-defining beam path of the detection optical unit. A controller can be configured to actuate the adjustable filter element to filter the spectrum of the beam path with different filter patterns in order thus to facilitate an angle-variable detection. In particular, the controller can be configured to capture images associated with different filter patterns. Different filter elements can be used in the process, for example a filter wheel or a DMD or a liquid crystal filter or a movable filter plate or an amplitude filter element. Filtering the spectrum of the beam path allows the detection to be restricted to certain angles of the light from the test object incident on the detector. Various examples of the angle-variable detection are thus based on amplitude filtering of the imaging spectrum in or near a pupil plane of the detection optical unit of the optical apparatus. This corresponds to the filtering of specific angles at which rays are incident on a sensor surface of the detector; i.e. individual rays are selectively transmitted in accordance with their angle in relation to the sensor surface. Different filter patterns are used; for each filter pattern, an associated image is captured by way of a detector. Different filter patterns can be used in the various examples described herein. By way of example, it may then be possible for each filter pattern to define at least one light-transmissive region, which is surrounded by an opaque region. By way of example, the light-transmissive region could be arranged at a distance from the optical axis of a beam path, which is defined by the detection optical unit; i.e., it can be arranged off-axis. In some examples, it is possible for the light-transmissive region to have a line-shaped embodiment, i.e., for the corresponding filter pattern to define a line. Only rays having angles in a narrowly limited angle range will then be transmitted. The filter patterns used can be transformed into one another for example by way of translation along a vector. When using a suitable filter pattern—for example a filter pattern having a line-shaped light-transmissive region that is arranged off-axis—a test object arranged in defocused fashion is presented as being offset. If two images that are associated with different filter patterns are captured, the digital contrast can be determined from a distance of the positions of the imaged representations of the test object.

Thus, corresponding digital contrasts can be generated by suitable processing of the various images that were captured by means of the angle-variable illumination and/or the angle-variable detection. For instance the digital contrast can be selected from the following group: virtual dark field; digital phase gradient contrast; and digital phase contrast.

By way of example, the phase gradient contrast could be determined by means of the techniques described in US 2017/276 923 A1. This means that opposite edges of the test object, as a phase object, can have different signs of the contrast.

A phase contrast—optionally a quantitative phase contrast—could be determined by way of example by means of the so-called quantitative differential phase contrast technique. Here, use can be made of the so-called quantitative differential phase contrast (QDPC) technique; see, for example, L. Tian and L. Waller: "Quantitative differential phase contrast imaging in an LED array microscope", Optics Express 23 (2015), 11394.

As described in the German patent application DE 10 2017 108 873.3, a phase contrast can also be obtained by the suitable use of a transfer function when processing the images to generate the result image with the digital contrast. By way of example, the transfer function can denote an object transfer function and/or an optics transfer function of the imaging system. The transfer function can be suitable for predicting the at least one image in the case of a specific illumination geometry and for a specific test object. For example, the transfer function can have a real-value component and/or an imaginary component. Here, the real-value component of the transfer function may correspond to a reduction in the intensity of the light when passing through the test object. Typically, an amplitude object exhibits significant damping of the light. Accordingly, the imaginary component of the transfer function can denote a shift in the phase of the light passing through the test object. Typically, a phase object exhibits a significant shift in the phase of the light. In this case, various techniques can be used for determining the transfer function. In one example, the transfer function could be determined on the basis of a technique according to Abbe. A reference transfer function could be determined by means of a technique according to Abbe. Here, the test object can be separated into different spatial frequency components. Then, a superposition of infinitely many harmonic gratings can model the test object. The light source can also be decomposed into the sum of various point light sources. A further example relates to determining the optical transfer function, which describes the imaged representation of the test object for a certain illumination geometry, on the basis of a technique according to Hopkins; see H. H. Hopkins "On the Diffraction Theory of Optical Images", Proceedings of the Royal Society A: Mathematical, Physical Engineering Sciences 217 (1953) 408-432. From this, it is possible to determine the transmission cross coefficient matrix (TCC), which is sometimes also referred to as a partly coherent object transfer function. The TCC can serve as a reference transfer function. The TCC approximately corresponds to the transfer function of the partly coherent imaging and contains the properties of the optical system and of the illumination geometry. The frequencies transferred by the optical unit are restricted to the range in which the TCC adopts values not equal to 0. A system with a high coherence factor or coherence parameter consequently has a relatively large range with TCC≠0 and it is able to map higher spatial frequencies. The TCC typically includes all the information of the optical system and the TCC often also takes account of complex-valued pupils, like in the Zernike phase contrast, for example, or as triggered by aberrations. The TCC may facilitate a separation of the optical transfer function from the object transfer function. It would also be possible in some examples for the transfer function to be predetermined and there need not be a determination as a TCC or according to Abbe.

Depending on the transfer function used, different techniques can be used to determine the result image. An exemplary technique is described in Tian, Waller in relation to equation 13. Illustrated there is how, on the basis of a Tikhonov regularization, a result image can be determined by way of an inverse Fourier transform and based on the transfer function H* and furthermore based on the spatial frequency space representation of a combination $\tilde{I}_{DPC}$ of two images of the test object with different illumination geometries:

$$\mathcal{F}^{-1}\left\{\frac{\sum_j H_j^*(u) \cdot I_{DPC,j}(u)}{\sum_j |H_j(u)|^2 + \alpha}\right\} \quad (1)$$

In this case, $\tilde{I}_{DPC}$ describes the spectral decomposition of a combination of two images $I_T$ and $I_B$, which were captured at different illumination geometries that illuminate semicircles that are complementary with respect to one another:

$$I_{DPC} = \frac{I_T - I_B}{I_T + I_B} \quad (2)$$

These are examples. In general, the illumination geometry does not, for example, have to be strictly of semicircular shape, By way of example, four light-emitting diodes that are arranged on a semicircle could be used. By way of example, defined illumination directions could thus be used, i.e., for instance, individual light-emitting diodes. Further, in equation 2, there could also be a normalization to 1, rather than to $I_T+I_B$, or to any other value. Instead of combining $I_T$ and $I_B$ by calculation, the raw data themselves could also be used in other examples, i.e., for example $I_{DPC}=I_T$ or $I_{DPC}=I_B$. By forming a corresponding quotient in equation 2, it is possible to reduce influences that are otherwise a disturbance, such as other material properties, color, etc. By forming the difference, it is possible, in particular, to reduce an absorption component based on a real-value component of the transfer function. $I_{DPC}$ is proportional to the local increase of the phase shift on account of the test object. The phase shift can be caused by a change in the thickness of the test object or of the topography of the test object and/or by a change in the optical properties.

By way of example, two images $I_{DPC,1}$ and $I_{DPC,2}$ can be determined, once with a pair of semicircular illumination geometries arranged top-bottom in a lateral plane perpendicular to the beam path ($I_{DPC,1}$), and once with a pair of semicircular illumination geometries arranged left-right in the lateral plane ($I_{DPC,2}$). Then, it is possible to take account of both $I_{DPC,1}$ and $I_{DPC,2}$ when determining the result image; see the summation index j in equation 1. Such techniques are based on specific assumptions and simplifications, for example in the case of the aforementioned formulation of a weak object approximation and the TCC. However, in other examples, other approximations and formalisms can be used. By way of example, an inversion other than the Tikhonov regularization could be used, for example direct integration or Fourier filtering of a different configuration. Even in such variations it is possible for the underlying properties of the transfer function, as described in various examples herein, to be maintained.

A virtual dark field can be generated by suitable processing of the images. By way of example, the virtual dark field is calculated as the component-by-component absolute value of the difference between each captured raw image and the corresponding mean value of the raw image. In the case of a plurality of different illumination geometries, the results of this calculation can be added component-by-component. The formula is:

$$I_{VDF}=\Sigma_j|I_j-<I_j>|$$

where <•> denotes the mean value over all pixels of the image and $I_j$ denotes the j-th captured image.

Thus, the use of the angle-variable illumination and/or the angle-variable detection allows the provision of the result image with a tailored contrast. This allows the defects to be made visible particularly clearly. As a result, the material testing can be carried out in particularly reliable and robust fashion. Moreover, the angle-variable illumination and/or the angle-variable detection can be used particularly quickly, and so the measurement time duration per test object can be reduced.

It is possible for the material testing to be carried out in fully automatic or partly automatic fashion.

Thus, the material testing could be carried out in automated fashion. Then, the quality of the optical test objects, for example, could be assessed automatically. In particular, there could also be a classification of the test object in accordance with a reference—such as an ISO standard, etc. By way of example, it would be possible to use an ANN which—by suitable training or machine learning on the basis of reference measurement data—directly indicates the compliance with the standard as a corresponding quality value. By way of example, the reference measurement data can show images captured by means of angle-variable illumination and can be annotated with corresponding "pass" and "fail" categories. In such a scenario, it may be possible to dispense with detecting and/or segmenting individual defects or determining the influence of individual defects on the optical effect of the test object. Rather, there can be an overall evaluation of the aggregated influence of all defects on the optical effect.

However, detection of individual defects would also be possible in a further example. Thus, in one example, carrying out the material testing comprises the application of a defect detection algorithm for automatically detecting defects.

The defect detection algorithm can be embodied to also provide additional information in respect of detected defects—in addition to the mere detection of defects. The additional information can describe properties of defects in qualitative and/or quantitative terms. By way of example, a relative position and/or form and/or size of detected defects could be determined. Such additional information can be stored in an error map.

In this case, the defect detection algorithm can generally employ different techniques. By way of example, it would be possible for the defect detection algorithm to use one or more of the following techniques: machine learning; thresholding, for example directly or on filtered data or by means of difference imaging on the basis of reference images; statistical analyses; forming correlations. For instance, the defect detection algorithm can use a trained ANN. There would be the option of, for example, automatically subdividing the detected defects into various classes by means of machine learning. Thus, in the process, there could be an assignment to different defect classes. For instance, the size of the defects could be quantified by means of a segmentation. The result image can be segmented accordingly. By way of example, when evaluating the defects by means of techniques from machine learning, the classification of the respective defect can be ascertained in relation to predefined defect classes, as can the associated segmentation of the respective result image in respect of the position of the defect.

On account of the large number of possible defect classes, it may be possible that not all defect classes are known a priori. To allow the defect detection algorithm to also detect defects belonging to a priori unknown defect classes, use can be made of an anomaly detector, for example. An anomaly detector can detect any deviation from a specification. Consequently, an anomaly detector can detect defects, even if these do not belong to previously known or trained defect classes. Examples include "support vector machines", Bayesian networks, etc.

Then, for instance, there can be testing in respect of complying with a suitable standard on the basis of the classes and sizes of the defects. To this end, an error map, created by the defect detection algorithm, can be compared to a reference error map, which represents the standard. By way of example, it could be possible to ascertain—on the basis of such a comparison—whether the test object is located within or outside of a tolerance. It could also be possible to ascertain that the check for complying with the suitable standard is even possible: for example, if an uncertainty in conjunction with the defect detection algorithm is too large, the check for compliance with the standard may not be possible or only possible to a limited extent because the associated error map is imprecise. Thus, it is possible for the material testing to be only partly fully automatic; i.e., the result of the automatic testing, in addition to the events "test object within tolerance" (or "pass") and "test object outside of the tolerance" (or "fail"), can include a third event: "uncertain". This can also be referred to as the "red-yellow-green" principle. In the "uncertain" case, a subsequent manual or semi-automated visual inspection could be proposed. By way of example, this could be realized by virtue of the testing method assessing test objects with defects with sizes or powers of ten as per the standard close to the tolerance limit as being "uncertain". Another option would consist in using an anomaly detector which determines whether the images contain defects or general structures for which no automatic testing is provided, for instance because the associated defect classes are unknown.

A further option comprises the replacement of the manual visual inspection by a semi-automated visual inspection. This can be implemented by virtue of the result image with the digital contrast being displayed to a user on a screen. Said user can carry out a comparison with the standard and, for instance, implement a quality value of the material testing on the basis of the comparison.

From this, it is evident that there is a wide range of options for implementing the material testing with result images with a digital contrast being taken into account. By way of example, there is a wide variety of employable defect detection algorithms.

Depending on the defect detection algorithm, it may generally also be possible for one or more of the unprocessed raw images to be taken into account directly when carrying out the material testing. This means that it may be possible to supplement the use of result images with the use of raw images. By way of example, a defect detection algorithm could obtain not only result images of the angle-variable illumination as input, but also raw images. By way of example, images captured when using a bright field illumination could be taken into account. As an alternative or in addition thereto, it would also be possible to take account of images which were captured during dark field illumination. By taking account of raw images, it may be possible—depending on the defect detection algorithm employed—to obtain an even higher accuracy.

A computing unit is configured to actuate an optical imaging system in order to capture, by means of at least one of angle-variable illumination and angle-variable detection, at least two respective images of a test object for each of the at least one pose of said optical test object in relation to the imaging system. The computing unit is also configured, for each of the at least one pose, to respectively process the corresponding at least two images to generate a result image with a digital contrast. The computing unit is also configured to carry out material testing for detecting defects of the test object on the basis of the at least one result image which was generated on the basis of the at least two images for the at least one pose of the test object.

By way of example, the computing unit could comprise a graphics card with a large number of parallel processing pipelines, for instance in contrast to a "central processing unit", CPU.

For such a computing unit, it is possible to achieve effects comparable with the effects which can be achieved for a method for material testing as described above.

The features set out above and features that are described below can be used not only in the corresponding combinations explicitly set out, but also in further combinations or in isolation, without departing from the scope of protection of the present invention.

BRIEF DESCRIPTION OF THE FIGURES

FIG. 8 is a flowchart of an exemplary method, wherein FIG. 8 illustrates aspects in relation to an image capture.

FIG. 9 is a flowchart of an exemplary method, wherein FIG. 9 illustrates aspects in relation to an image evaluation.

FIG. 10 is a flowchart of an exemplary method, wherein FIG. 10 illustrates aspects in relation to material testing.

FIG. 11 schematically illustrates image capture and image evaluation for generating result images with a digital contrast in accordance with various examples, and material testing.

DETAILED DESCRIPTION OF THE INVENTION

The properties, features and advantages of this invention described above and the way in which they are achieved will become clearer and more clearly understood in association with the following description of the exemplary embodiments which are explained in greater detail in association with the drawings.

The present invention is explained in greater detail below on the basis of preferred embodiments with reference to the drawings. In the figures, identical reference signs denote identical or similar elements. The figures are schematic representations of different embodiments of the invention. Elements illustrated in the figures are not necessarily illustrated as true to scale. Rather, the various elements illustrated in the figures are rendered in such a way that their function and general purpose become comprehensible to the person skilled in the art. Connections and couplings between functional units and elements as illustrated in the figures can also be implemented as an indirect connection or coupling. A connection or coupling can be implemented in a wired or wireless manner. Functional units can be implemented as hardware, software or a combination of hardware and software.

Figure 1:
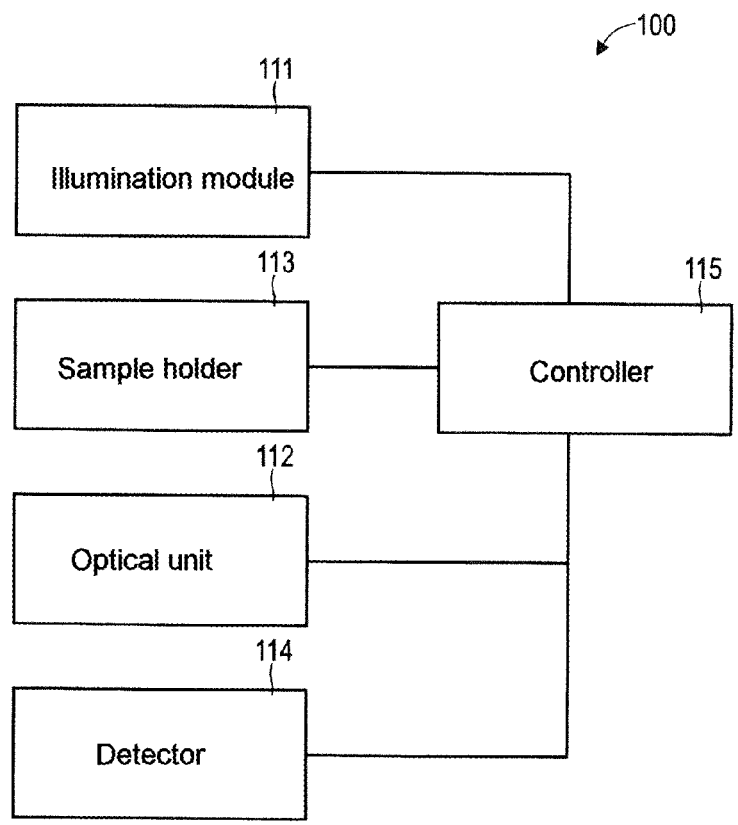
FIG. 1 schematically illustrates an optical imaging system in accordance with various examples.

FIG. 1 illustrates an exemplary optical imaging system 100 (also referred to as optical apparatus 100 below). By way of example, the optical apparatus 100 in accordance with the example in FIG. 1 can implement a light microscope, for example in transmitted-light geometry. The optical apparatus 100 can allow the magnified representation of small structures of a test object or test object fixed by a sample holder 113. A detection optical unit 112 is configured to produce an imaged representation of the test object on a detector 114. Then, the detector 114 can be configured to capture one or more images of the test object. Observation through an eyepiece is likewise possible.

An illumination module 111 is configured to illuminate the test object fixed on the sample holder 113. By way of example, this illumination could be implemented by means of Köhler illumination. Here, use is made of a condenser lens and a condenser aperture stop. This leads to a particularly homogeneous intensity distribution of the light used for illumination purposes in the plane of the test object. By way of example, a partially incoherent illumination can be implemented. The illumination module 111 could also be configured to illuminate the test object in dark field geometry.

A controller 115 is provided to actuate the various components 111-114 of the optical apparatus 100. For example, the controller 115 could be configured to actuate a motor of the sample holder 113 to implement an autofocus application, By way of example, the controller 115 could be implemented as a microprocessor or microcontroller. As an alternative or in addition thereto, the controller 115 could comprise an FPGA or ASIC, for example.

Figure 2:
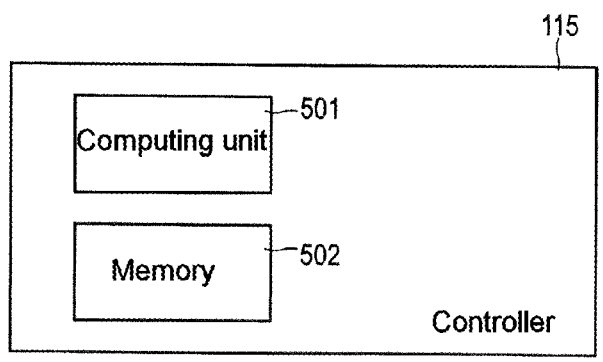
FIG. 2 schematically illustrates a controller for an optical imaging system in accordance with various examples.

FIG. 2 illustrates aspects relating to the controller 115. The controller 115 comprises a computing unit 501, for example a microprocessor, an FPGA, or an ASIC. The computing unit 501 could also be a PC with a central computing unit and/or a computing unit embodied for parallel processing, i.e., a graphics card, for instance. In addition, the controller 115 also comprises a memory 502, for example a non-volatile memory. It is possible that program code is stored in the memory 502. The program code can be loaded and executed by the computing unit 501, Then, the computing unit 501 can be configured to carry out, on the basis of the program code, techniques for material testing of an optical test object, for actuating the optical apparatus for carrying out an angle-variable illumination or angle-variable detection, etc.

In one example, the illumination module 111 is thus configured to facilitate an angle-variable illumination. This means that different illumination geometries of the light employed to illuminate the test object can be implemented by means of the illumination module 111. The different illumination geometries can correspond to an illumination of the test object from at least partly different illumination directions.

Figure 3:
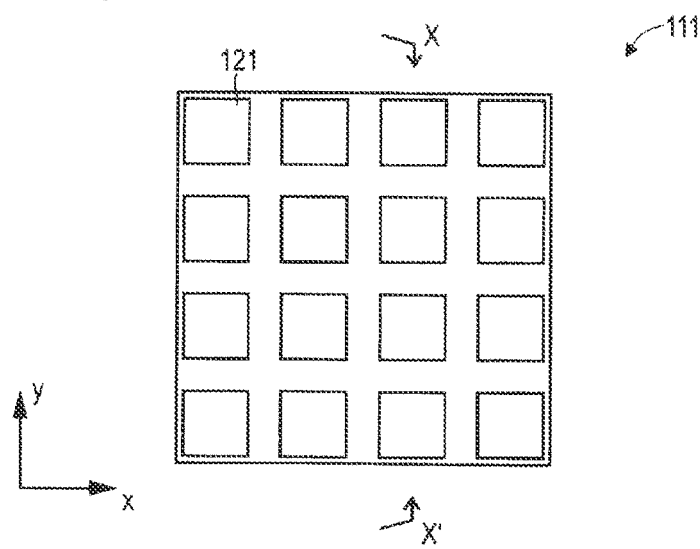
FIG. 3 schematically illustrates an illumination module of an optical imaging system in accordance with various examples, wherein the illumination module is configured for the angle-variable illumination.

Here, different hardware implementations for providing the different illumination geometries are possible in the various examples described herein. By way of example, the illumination module 111 could comprise a plurality of adjustable illumination elements that are configured to locally modify or emit light. The controller 115 can actuate the illumination module 111 or the illumination elements for the purposes of implementing a certain illumination geometry. FIG. 3 illustrates further examples in this respect.

FIG. 3 illustrates aspects in relation to the illumination module 111. Here, the illumination module 111 is configured for angle-variable illumination. FIG. 3 illustrates that the illumination module 111 comprises a multiplicity of adjustable illumination elements 121 in a matrix structure. Here, the matrix structure is oriented in a plane perpendicular to the beam path of the light (lateral plane; space domain coordinates y).

Instead of a matrix structure it would also be possible, in other examples, to use different geometric arrangements of the adjustable elements, for example a ring-shaped arrangement, a semicircular arrangement, etc.

In one example, the adjustable illumination elements 121 could be implemented as light sources, for example as light-emitting diodes. Then, it would be possible, for example, for different light emitting diodes with different luminous intensities to emit light for illuminating the test object. An illumination geometry can be implemented as a result. In a further implementation, the illumination module 111 could be implemented as a spatial light modulator (SLM). The SLIM can undertake an intervention in a condenser pupil in a spatially resolved manner, which may have a direct effect on the imaging. It would also be possible to use a DMD.

Figure 4:
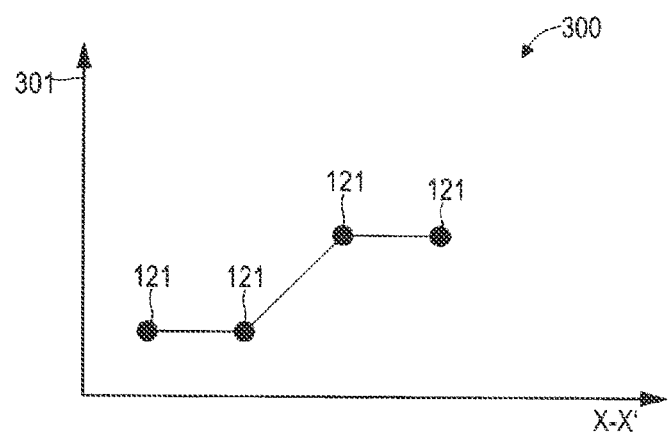
FIG. 4 schematically illustrates an illumination geometry of the angle-variable illumination in accordance with various examples.

FIG. 4 illustrates aspects in relation to an exemplary illumination geometry 300, FIG. 4 illustrates the provided luminous intensity 301 for the various adjustable elements 121 of the illumination module 111 along the axis X-X' of FIG. 3. The illumination geometry 300 exhibits a dependence on the position along the axis X-X' and is therefore angle-variable. By selecting elements 121 at a further or less far distance, it is possible to vary the magnitude of the angle-variable illumination. The orientation of the angle-variable illumination can be modified by varying the direction between the elements 121 activated in the various illumination geometries.

The imaging position of the optical test object varies according to the illumination geometry 300. This change in the imaging position can be exploited to generate the digital contrast.

In addition to such angle-variable illumination techniques, an angle-variable detection can also be used in a further example. For the angle-variable detection, the detection optical unit 112 is configured accordingly. Corresponding examples are illustrated in conjunction with FIG. 5.

Figure 5:
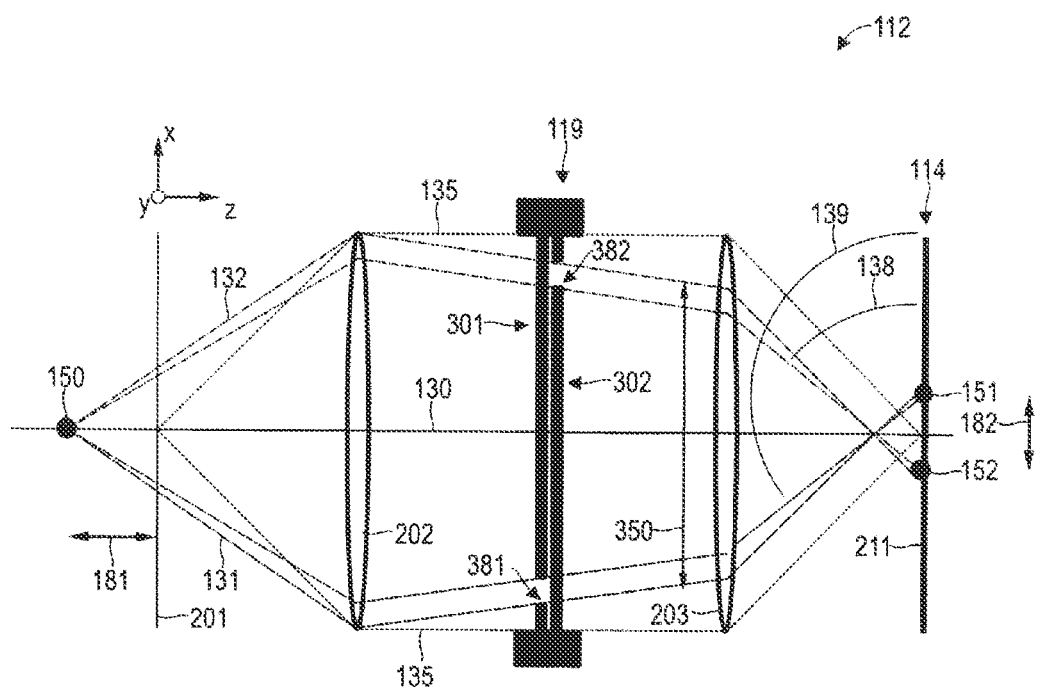
FIG. 5 schematically illustrates a detection optical unit of an optical imaging system in accordance with various examples, wherein the detection optical unit is configured for the angle-variable detection.

FIG. 5 illustrates aspects relating to the detection optical unit 112. FIG. 5 illustrates an embodiment of the detection optical unit 112 for angle-variable detection. FIG. 5 illustrates an exemplary implementation of the detection optical unit 112 with an adjustable filter element 119. The filter element 119 is arranged in the region of a conjugate plane of the beam path 135, i.e., near or close to a pupil plane of the beam path 135. Therefore, there is filtering of the (spatial frequency) spectrum of the beam path 135. In real space, this corresponds to the selection of different angles 138, 139, at which the light is incident on the sensor surface 211 along corresponding rays 131, 132 from the test object 150. The filter element 119 also forms an aperture stop. The beam path 135 is implemented by way of lenses 202, 203.

FIG. 5 shows the rays 131, 132 of the beam path 135 starting from a test object 150, which is arranged in a defocused manner, through the detection optical unit 112 up to the detector 114, i.e., in particular, a sensor surface 211 of the detector 114. The rays 131 (dashed lines in FIG. 5) here corresponds to a filter pattern 380, which defines a first light-transmissive region 381 having an extent in the X-direction, while the rays 132 (dashed-dotted lines in FIG. 5) correspond to a filter pattern 380-2, which defines a second light-transmissive region 382 having an extent in the X-direction. The test object 150 is arranged in a defocused manner and has a focus position 181, which is not equal to zero. Therefore, the rays are incident on the sensor surface 211 at different angles 138, 139 (angle-variable detection). In addition, the imaged representations 151, 152 of the test object 150 are spaced apart from one another.

On account of a focus position 181 that is not equal to zero—i.e., a distance of the position of the test object 150 along the optical axis 130 from the focal plane 201 of the detection optical unit 112—the imaged representations 151, 152 of the test object 150 that are brought about by the rays 131, 132 are positioned on the sensor surface 211 in a manner spaced apart by a distance 182. Here, the distance 182 is dependent on the focus position 181:

$$\Delta z = \frac{\Delta x}{2\frac{\Delta k}{\emptyset P} \cdot m \cdot NA} \sqrt{1 - \left(\frac{\frac{\Delta k}{\emptyset P} NA}{m}\right)^2}$$

where $\Delta z$ denotes the focus position 181, $\Delta x$ denotes the distance 182, $\emptyset P$ denotes the diameter of the aperture stop, $\Delta k$ denotes the length of the distance between the light-transmissive regions of the filter patterns 380-1, 380-2, m denotes the magnification of the detection optical unit 112, and NA denotes a correction value based on the oblique angle of incidence 138, 139. NA can be determined for example empirically or by beam path calculation.

The equation shown is an approximation. In some examples it may be possible to further take into account a dependence of the angle of incidence 138, 139 on the focus position 181, i.e. $\Delta z$. This dependence can be system-specific.

On account of the dependence of the focus position $\Delta z$ on the distance $\Delta x$, a digital contrast can be generated by processing appropriate images—which are captured with the different filter patterns 380-1, 380-2. In this case, for instance, it is possible to exploit the fact that an optical test object typically has a significant extent in the Z-direction and therefore edges extending in the Z-direction—for instance, edges of defects—can be made visible by the presence of the distance $\Delta x$ in the images.

In principle, it may be desirable in various examples to define particularly thin light-transmissive regions 381, 382—i.e. a small extent in the X-direction. This can make possible a particularly high accuracy when determining the distance 182 and thus the focus position 182. On the other hand, the intensity on the sensor surface 211 is decreased on account of a small extent of the light-transmissive regions in the X-direction. For this reason, a balance can be struck between intensity and accuracy. It is evident from FIG. 5 that the zero order of the light diffracted by the test object 150 is not detected; for this reason, the intensity is comparatively low.

FIG. 5 is a one-dimensional illustration of the filter patterns 380-1, 380-2. In some examples, however, it is also possible to use filter patterns that have a two-dimensional extent, i.e. an extent in the XY-plane.

Figure 6:
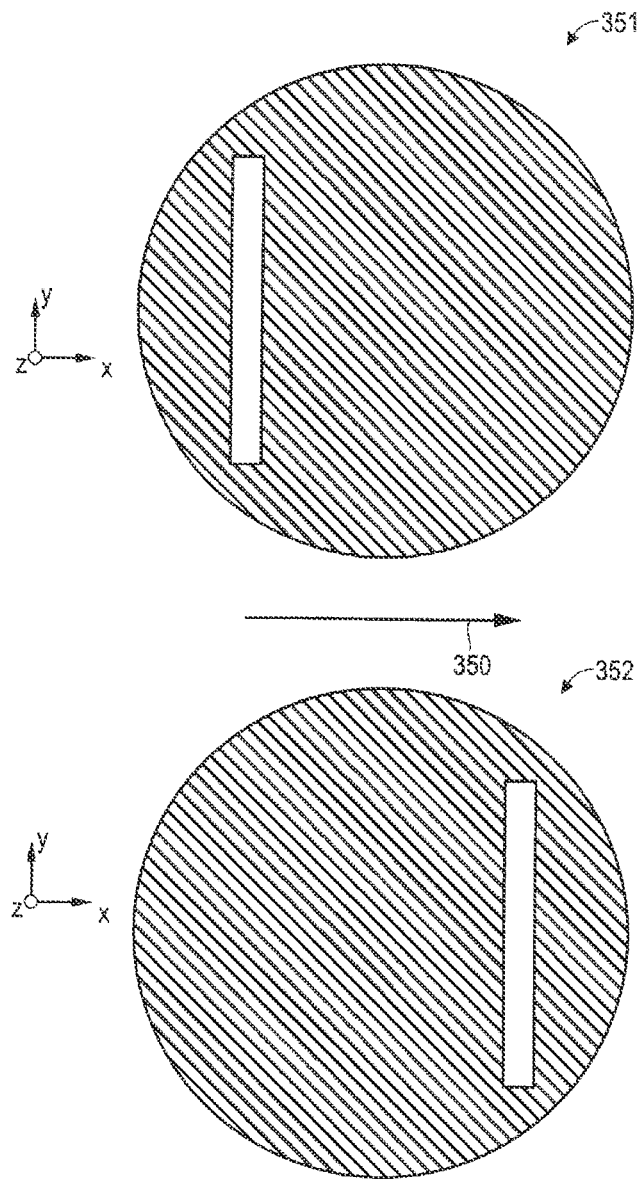
FIG. 6 schematically illustrates filter patterns of the detection optical unit in accordance with various examples.

FIG. 6 illustrates aspects in relation to exemplary filter patterns 351, 352. In the example in FIG. 6, the filter pattern 351 defines a line, and the filter pattern 352 defines a further line. The filter pattern 351 can be transformed into the filter pattern 352 by way of translation along the vector 350. The lines of the filter patterns 351, 352 are parallel along their entire lengths. Generally, it would also be possible to use lines which run parallel with respect to one another along only some of their lengths, for example along at least 50% of their lengths or along at least 80% of their lengths. In this way, a more flexible choice of filter patterns 351, 352 can be ensured.

It is evident from FIG. 6 that the lines of the filter patterns 351, 352 are arranged off-axis in relation to the optical axis 130. As a result, the length of the vector 350 can be maximized, as a result of which the distance 182 between the imaged representations 151, 152 can be maximized. As a result, the magnitude of the angle-variable detection can be adapted.

By using the filter patterns 351, 352, which can be transformed into one another by way, of translation along the vector 350, it is possible to obtain a one-dimensional spacing of the imaged representations 151, 152. The distance 182 is then parallel to the vector 350. Rotating the filter patterns allows the orientation of the angle-variable detection to be altered.

Figure 7:
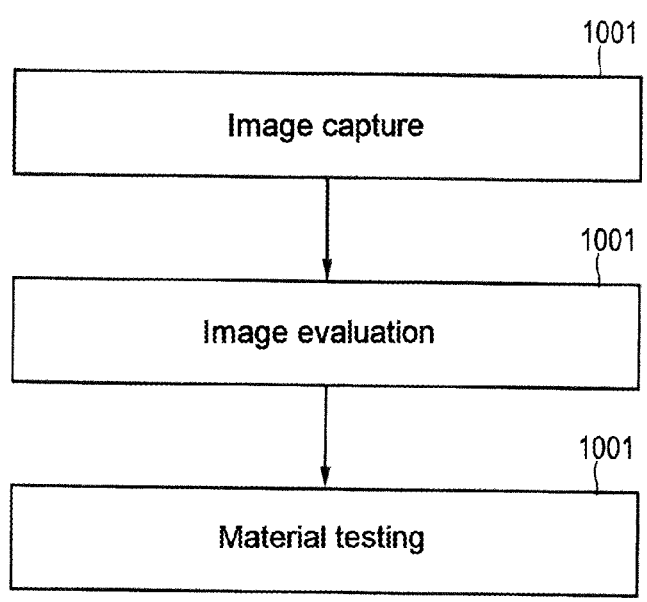
FIG. 7 is a flowchart of an exemplary method.

FIG. 7 illustrates a flowchart of an exemplary method. By way of example the method in accordance with FIG. 7 could be carried out by the controller 115 (cf. FIG. 2). By way of example, the computing unit 501 could load program code from the memory 502 and thereupon carry out the method according to FIG. 7.

Image capture takes place in block 1001. By way of example, an optical imaging system, such as the optical apparatus 100 of FIG. 1, could be actuated to capture one or more images in block 1001.

In particular, the optical imaging system can be actuated to capture at least two images of an optical test object by means of at least one of angle-variable illumination and angle-variable detection in block 1001.

The angle variable illumination can comprise the use of a plurality of illumination geometries, wherein, in each case, at least one illumination geometry is associated with one of the at least two images. By way of example, different illumination geometries can be implemented by the activation of different light sources.

The angle-variable detection can be implemented by filtering a spectrum of a beam path by the provision of appropriate filters near or in the pupil plane of a detection optical unit of the optical imaging system.

The magnitude and/or orientation of the angle-variable illumination can be varied by varying the employed light sources or the employed illumination geometries. Accordingly, the magnitude and/or orientation of the angle-variable detection can be varied by varying the employed filter patterns.

If the magnitude and/or the orientation of the angle-variable illumination and/or of the angle-variable detection are varied; this can vary the magnitude and/or direction of the subsequently determined digital contrast. Certain defects can be made visible particularly clearly by the variation of the direction of the digital contrast.

Image evaluation takes place in block 1002. This can comprise processing the at least two images captured in block 1001 for the purposes of generating a result image with a digital contrast. By way of example, the digital contrast can be selected from the following group: phase contrast; phase gradient contrast; and virtual dark field.

Then, material testing takes place in block 1003. In general, material testing can serve to assess the quality of the optical test object.

In this case, various techniques can be applied for the purposes of carrying out the material testing in block 1003. In a simple example, it would be possible, for example, for the result image with the digital contrast to be displayed to a user; then, the user is able to manually identify defects.

In block 1003, the material testing can also be carried out in automated fashion. By way of example, a quality value can be determined, for instance using an ANN or any other algorithm with machine learning. As an input map, the ANN can receive one or more of the result images from block 1002. As an output, the ANN can provide the quality value. By way of example, the quality value could specify whether the test object is "within the standard", "outside of the standard" or—optionally—"uncertain".

In a specific implementation, carrying out the material testing can also serve to detect individual defects of the optical test object, for example using a defect detection algorithm for automated detection of defects.

Blocks 1001-1003 need not be worked through strictly in sequence; rather, it would be possible, for example, to start the image evaluation 1002 and possibly the material testing in blocks 1002, 1003 already during the image capture of block 1001.

Figure 8:
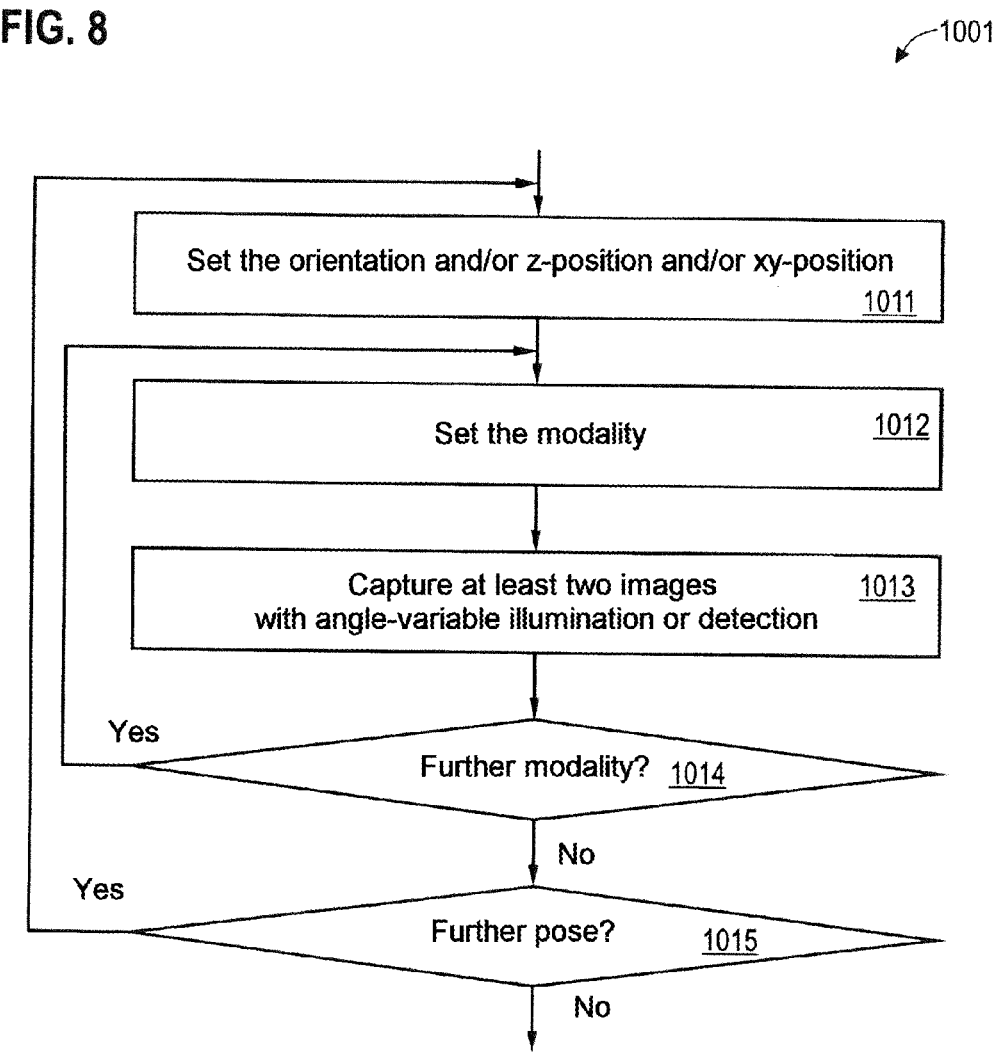

FIG. 8 is a flowchart of an exemplary method. In particular, FIG. 8 illustrates an exemplary implementation of block 1001 of FIG. 7. This means that FIG. 8 shows details for the implementation of the image capture.

An orientation and/or a Z-position and/or an XY-position of the optical test object is set in block 1011. This means that the pose of the test object is set. By way of example, this could be implemented by actuating a motorized sample holder 113 by way of the controller 115 (cf. FIG. 1). By way of example, the sample holder could rotate the optical test object in order to set the orientation. By way of example, it would be possible for the sample holder 113 to displace the optical test object along the beam path in order to set the Z-position—i.e., the focus position. In a further variant, it would be possible for the XY-position—i.e., the position perpendicular to the beam path—to be set.

In a further example, the user is prompted by way of a human-machine interface to manually set a certain pose of the test object.

In a further example, the test object remains stationary but the detection optical unit is displaced relative to the test object (camera defocus).

Such techniques, as described in conjunction with block 1011, are helpful, in particular, if the optical test object has a large extent in comparison with the field-of-view of the optical imaging system. Then, setting the Z-position—for instance, by internal focusing or camera defocus—allows a different plane of the optical test object to be imaged in focus on the detector 114 in each case. As a result, a volume testing of the optical test object can be facilitated by obtaining a stack of images for different Z-positions (so-called Z-stacks). The same also applies to setting the XY-position, which is sometimes also referred to as "stitching". As a result, different lateral positions of the optical test object can be brought into the field of view of the optical imaging system. As a result, it is possible to obtain a stack of images which corresponds to different lateral positions of the optical test object (so-called XY-stack).

A further example for processing an optical test object with a large extent in comparison with the field of view of the optical imaging system comprises the use of so-called "sliding windows". By way of sliding windows, it is possible to implement a processing of images—for instance, result images and/or raw images—even if these images do not completely fit into a memory of the corresponding computing unit, for instance in a level 1 or level 2 memory of the computing unit. Then, it may be necessary to initially buffer store the corresponding image in an external RAM block and to subsequently load and process individual pieces of the images—in accordance with the sliding window. Here, it is possible, in principle, for successive sliding windows of a sequence of sliding windows to contain an overlap region which images the same region of the test object. Thus, it would be possible to evaluate sequentially overlapping regions of an image e.g., by means of an algorithm with machine learning—and subsequently combine the results of this evaluation to form an overall result, for instance in order to obtain the error map, as described herein.

Here, it is possible, in principle, to combine such an approach with sliding windows with a technique that uses XY-stacks of images in order thus, for example, to directly interlink the image recording and evaluation: thus, instead of initially recording an entire XY-stack and then providing the latter to the ANN—or, in general, an algorithm with machine learning—as an input, each individual image can be transferred directly from the camera as an input to the ANN during the recording of an XY-stack (e.g., with overlap of the image edges). Thus, as a general rule, (i) the capture of raw images and the generation of result images and (ii) the performance of the material testing on the basis of an algorithm with machine learning can be carried out at least partly in parallel, for instance for different poses of the test object in relation to the imaging system and/or for different sliding windows of a corresponding sequence. As a result, the overall time for the image recording and evaluation can be significantly reduced in comparison with reference implementations.

Setting the orientation of the optical test object can be helpful, in particular, if certain regions of the optical test object are only visible under a certain orientation; by way of example, this would be conceivable in the case of partly mirrored surfaces, etc. Some defects might only be visible under a certain orientation.

Thus, in general, the pose of the optical test object in relation to the optical imaging system can be varied by way of the various techniques for arranging the optical test object in relation to the optical imaging system, as described in conjunction with block 1011.

Subsequently, one or more imaging modalities are set in block 1012. In general, very different imaging modalities can be set in the process, for instance: color of the light used; polarization of the light used; magnitude of the angle-variable illumination and/or angle-variable detection; orientation of the angle-variable illumination and/or angle-variable detection.

What can be achieved by such a variation of the imaging modality is that certain defects can be made particularly clearly visible, i.e., made to have a high contrast. By way of example, certain defects could only be visible in the case of a certain orientation and magnitude of the angle-variable illumination and/or angle-variable detection. Accordingly, it would be possible for certain defects of the optical test object to only be visible in the case of a certain color or polarization of the light employed.

Subsequently, at least two images are captured with angle-variable illumination and/or angle-variable detection in block 1013. In the process, use is made of the one or more imaging modalities set in block 1012. Moreover, the poses of the optical test object with respect to the optical imaging system, set in block 1011, are used.

When capturing the various images in one iteration of block 1013, the angle of the illumination or the angle of the detection is varied for the various images, in accordance with the modality set. By way of example, use could be made of two line patterns 351, 352 (cf. FIG. 6); these have the same orientation (in the X-direction) and also the same magnitude of the angle-variable detection (same distance from the principal optical axis).

In block 1014, a check is carried out as to whether there should be a further variation of the one or more imaging modalities for the currently valid pose. Should this be the case, block 1012 is carried out again and the corresponding variation of the one or more imaging modalities is carried out. Then, at least two images are captured, once again, by means of angle-variable illumination and/or angle-variable detection in a further iteration of block 1013—for the newly set one or more imaging modalities. By way of example, line patterns rotated through 90° in the XY-plane in relation to the line patterns 351, 352 of FIG. 6 could be used in a further iteration—this would correspond to a variation of the orientation of the angle-variable detection. By way of example, the magnitude of the angle-variable detection could be obtained by displacing the light-transmissive regions of the line patterns 351, 362 along the X-axis.

Once it is finally determined in block 1014 that there should be no further variation of the one or more imaging modalities for the current pose, block 1015 is carried out, A check as to whether a further pose should be set is carried out in block 1015. Should this be the case, block 1011 is carried out again.

Otherwise, the image capture is complete. Subsequently, the image evaluation in block 1002 takes place (cf. FIG. 7).

Figure 9:
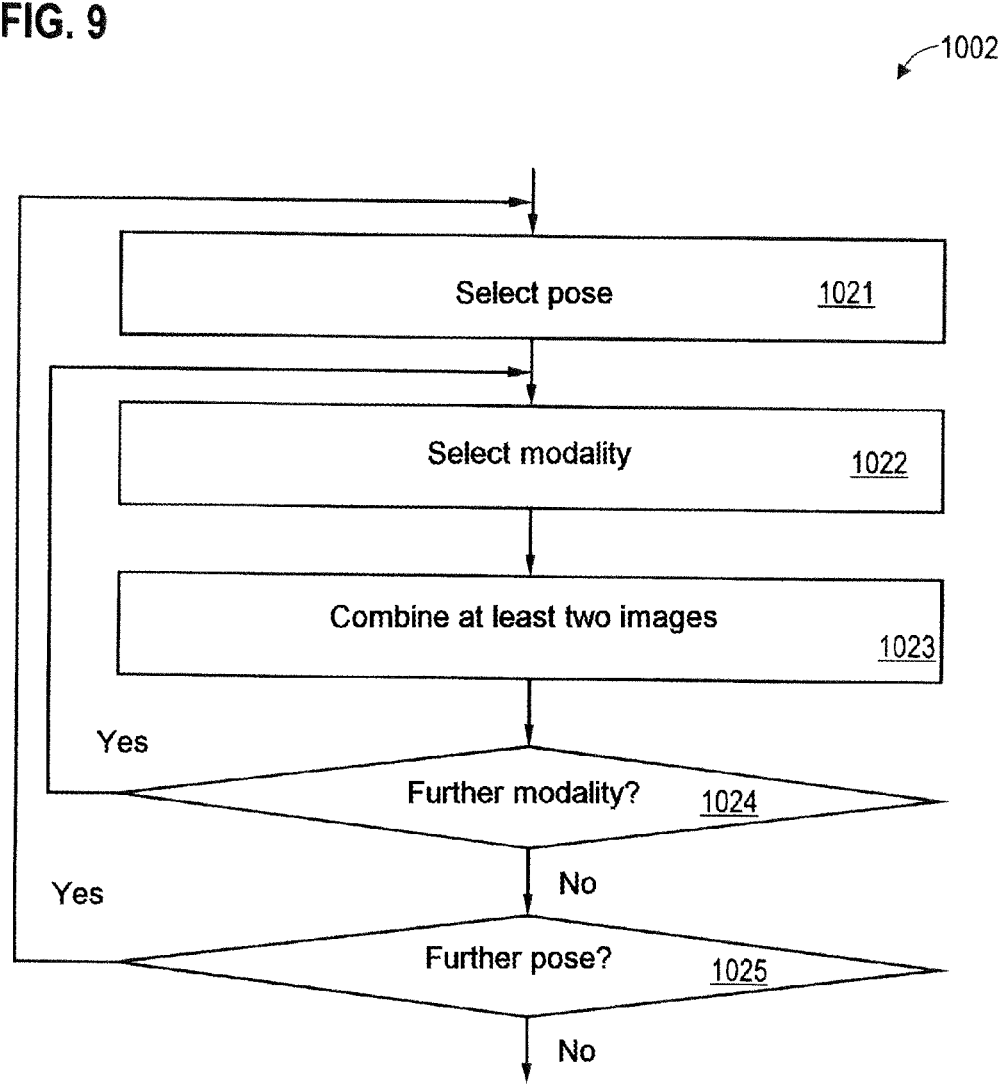

FIG. 9 is a flowchart of an exemplary method. FIG. 9 relates to techniques that can be carried out in conjunction with the image evaluation in accordance with block 1002 of FIG. 7.

Initially, a current pose is selected in block 1021 from one or more specified poses, for which the images were captured. By way of example, all poses which were activated in block 1011 of FIG. 8 can be stored in a list and subsequently be selected iteratively in block 1021.

Subsequently, an imaging modality is selected in block 1022. By way of example, all one or more imaging modalities, which were presented in block 1012 of FIG. 8, could once again be stored in a list and then be selected in succession in various iterations of block 1022.

Then, the respective at least two images, which were captured in block 1013 of FIG. 8 for the currently selected pose and for the currently selected one or more imaging modalities, are combined in block 1023. As a result, a respective result image is obtained. The result image has a digital contrast.

Depending on the type of combined block 1023, the result image can have different digital contrasts.

In one example of the angle-variable illumination, it is possible, for example, to respectively capture pairs of images which are respectively associated with complementary, line-shaped illumination directions (for instance, this would correspond to the activation of all light sources 121 which are arranged on one column or in one row of the matrix of the illumination module 111 of FIG. 3). Accordingly, use can also be made—in the case of an angle-variable detection—of one of the line-shaped filter patterns 351, 352 of FIG. 6, which can then be rotated through 90° in the XY-plane.

In that case, a difference could be formed, for example in accordance with $$I_{Result,1} = \frac{I_{left} - I_{right}}{I_{left} + I_{right}}$$

$$I_{Result,2} = \frac{I_{top} - I_{bottom}}{I_{top} + I_{bottom}}$$

where Ileft and Iright denote the images that are in each case associated with a semicircular illumination geometry or filter pattern that is oriented left or right, and where Itop and Ibottom denote the images that are in each case associated with a semicircular illumination geometry or filter pattern oriented top or bottom. As a result, a phase gradient contrast can be generated for the result images.

Accordingly, it is also possible to determine different result images for different filter patterns during the angle-variable detection.

Subsequently, a check is carried out for the currently selected pose in block 1024 as to whether one or more further imaging modalities are present for the purposes of selecting a further iteration of block 1022.

Should this not be the case, a check is subsequently carried out in block 1025 as to whether further images are captured for a further pose and, where applicable, a further iteration of block 1021 is carried out. If no further pose is available for selection, the image evaluation is completed. Then, all images have been processed and corresponding result images are available.

Subsequently, material testing can take place. Corresponding examples are illustrated in FIG. 10.

Figure 10:
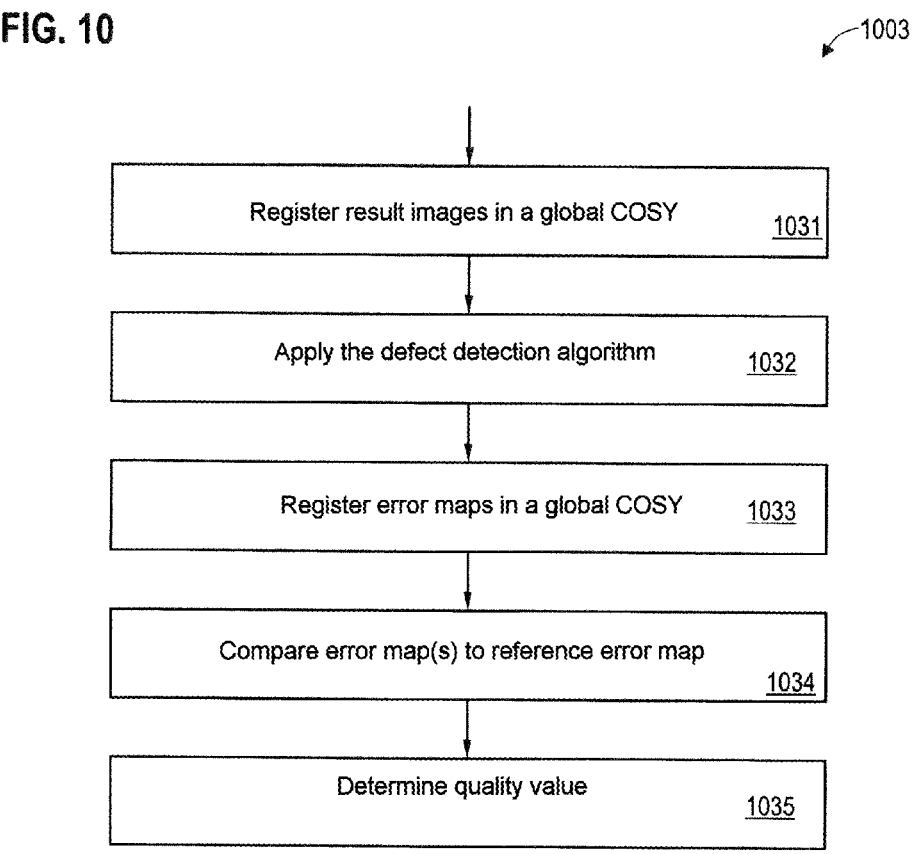

FIG. 10 illustrates an exemplary method. The method in accordance with FIG. 10 illustrates an exemplary implementation of the material testing as per block 1003 of FIG. 7.

Initially, all result images—which were obtained from a plurality of iterations of block 1023—are registered in a global coordinate system in—optional—block 1031. Here, different result images correspond to different poses (cf. block 1021 of FIG. 9). Therefore, different result images also image different regions of the optical test object and/or different perspectives on the optical test object. This can be taken into account by registering the result images in a common coordinate system in block 1031.

In block 1032, a defect detection algorithm is applied to the available result images for the automated detection of defects. Optionally, the defect detection algorithm could also be applied to the available raw images.

Should block 1031 have been carried out, the defect detection algorithm can be applied in combination to the registered result images. This means the registered result images can be transferred collectively to the defect detection algorithm and the defect detection algorithm takes account of relationships between the result images. This can correspond to a coherent evaluation of the registered result images. As a result, it is possible to detect 3D defects. By way of example, this allows defects which have an extent across a plurality of result images to be detected. In the case of a Z-stack (XY-stack) of result images, this allows defects extending in the i-direction (XY-plane) to be detected, for example.

Should block 1031 not be carried out, it would be possible to respectively apply the defect detection algorithm to each of the result images. This means that the defect detection algorithm can be carried out multiple times and receives respectively one result image as input per execution. Then, the defect detection algorithm need not be embodied to take account of relationships between the result images. This corresponds to non-coherent evaluation of the result images. Then, the defect detection algorithm can have a particularly simple embodiment.

By way of example, the defect detection algorithm can output one respective error map per execution. If the defect detection algorithm is carried out multiple times for different result images, a plurality of error maps are obtained. The error maps mark defects in the region of the optical test object imaged by the respective result image.

Block 1033, in turn, is an optional block. In particular, block 1333 can be carried out if block 1031 was not carried out.

In block 1033, the defects marked by the error maps can be registered in a global coordinate system. This allows defects imaged by different results images, which defects are detected by the respective execution of the defect detection algorithm, to be related to one another. In this way, it is possible to obtain a global error map, in which defects are marked in the entire region of the optical test object.

Subsequently, there is a comparison of one or more error maps, for instance a global error map, with one or more reference error maps in block 1034. By way of example, reference error maps can be derived from an industrial standard. By way of example, reference error maps can indicate tolerances for certain defects, By way of example, a quality value of the material testing can be determined on the basis of the comparison in conjunction with block 1034. By way of example, a check could be carried out as to whether the detected defects remain within a tolerance range specified by the reference error map. Thus—in conjunction with determining the quality value—there can be assignment of the test object into one of a plurality of predefined result classes—e.g., "within tolerance"/"out of tolerance" in respect of a suitable standard or any other specification.

If there is any uncertainty in the context of the comparison between the error map and the reference error map, there can also be an "uncertain" output; in that case, a manual visual inspection can be proposed. This corresponds to a "red-yellow-green" principle. Such an uncertainty in the context of the comparison may arise for a number of reasons. By way of example, an anomaly detector, which is used in conjunction with the defect detection algorithm, could indicate that unknown defects are present, which defects, for instance, are not detected by an algorithm—such as, e.g., an ANN—trained with different defect classes.

The quality value can then be indicated in block 1035 on the basis of the comparison of block 1034. By way of example, the quality value can indicate whether or not the optical test object complies with a certain industrial standard. A quantitative statement could also be made, for example in respect of the number, size or distribution of defects which are represented by the quality value.

Block 1034 can adopt different embodiments depending on the available error maps. By way of example, if the defect detection algorithm is applied in block 1032 to a multiplicity of result images which are all registered in a common global coordinate system, the comparison in block 1034 could be carried out between a single global error map, which is obtained by the corresponding defect detection algorithm, and the reference error map. However, if many different error maps are applied as a result of a plurality of executions of the defect detection algorithm in block 1032, these plurality of error maps could each be compared to the reference error map or to a plurality of corresponding reference error maps. Here, a relative arrangement of the various error maps could be taken into account by way of an appropriate registration in block 1033.

As a general rule, the error maps can have different informational content in the various examples described herein.

As a general rule: different items of information in respect of the defects detected by the defect detection algorithm can be stored in the error map.

(i) By way of example, it would be possible for a defect detection algorithm to provide a corresponding segmentation of the respective result image for a detected defect. Thus, it would be possible for the error map to mark the position of the defect—or, in general, the relative position, orientation and/or form—by way of the segmentation.

(ii) As an alternative or in addition thereto, it would also be possible for the defect detection algorithm to provide, for a detected defect, a corresponding classification of the respective defect in relation to predefined defect classes. This information can also be stored in the error map. Examples of defect classes include: scratches; inclusions; material defects; matt surfaces; streaks; flaking; bore errors; optical offset; and turning marks. Further examples of defect classes are: dirt; chips; holes; cracks; splashes; spray points; residues; stains; imperfections; shifted coating; chromatic aberration; run-off track; glass defects; bubbles; cuts; double coating.

(iii) A further example of additional information which can be ascertained and output by the defect detection algorithm is an influence of the respective defect on the optical effect of the test object. By way of example, it may be the case that some defects—although being geometrically comparatively large, for instance—only have a small influence on the optical effect of the test object. On the other hand, even small defects may have a large influence on the optical effect of the test object in some scenarios. By way of example, the influence of the defect on the optical effect could describe, either qualitatively or else quantitatively, a change in the optical effect. By way of example, the change in the focal length of a lens, which implements the test object, could be specified in terms of the sign of the change and, optionally, in terms of the magnitude of the change.

(iv) An even further example of additional information which can be ascertained and output by the defect detection algorithm is an aggregated influence of all detected defects on the optical effect of the test object. This is based on the discovery that it can sometimes be possible for two separate defects to be intensified or attenuated overall, depending on the type and arrangement of the defects.

From the aforementioned points (i)-(iv), it is evident that the error map output by the defect detection algorithm in various examples can contain different additional information items in respect of the defects.

Depending on the informational content of an error map, the comparison in block 1034 can assume various embodiments. In the case of simple information, the reference error map could specify, for example, the maximum extent of defects and/or maximum density of defects—independently of the classification of the defect. In a further embodiment, the reference error map could specify the maximum number of defects of a certain defect class, for example. These and further examples can be combined with one another.

Typically, certain powers of ten are specified in standards. By way of example, the reference error map can map these powers of ten. In the simplest case, these powers of ten are defined by way of the edge length of the error area—considered to be square, for instance. This facilitates a direct relationship between the segmentation by the defect detection algorithm—i.e., the number of pixels assigned to the defect—and the power of ten by way of the imaging scale.

Moreover, the length and width can be determined, particularly in the case of scratches but, in general, in the case of defects from other defect classes, too. This can comprise the adaptation of algorithmic pattern shapes to the segmentation; as an alternative or in addition thereto, the size of the scratches can be determined by means of image processing processes—e.g., skeleton, medial axis transformation.

Particularly in the case of chips at the edge and layer offsets, the relative position and extent of the defect can be determined in relation to the test surface. This can be implemented by means of an algorithm which captures the surroundings of the defect, e.g., the accurate relative position of the edge of the test object.

A further criterion that can be mapped by the reference error map and the error map is the frequency of defects in a certain percentage of the test area. This can correspond to the maximum density of defects.

As a further general rule, a different type of defect detection algorithm can be used, depending on implementation, in the various examples described herein. By way of example, the defect detection algorithm could comprise a trained ANN in one implementation. By way of example, the defect detection algorithm could comprise a convolution network. The ANN can be configured to obtain one or more result images as an input map for an input layer. Typically, an ANN comprises an input layer, one or more hidden layers, and an output layer. The output layer can comprise one or more neurons. The position and/or classification of detected defects can be indicated in this way on the basis of the activity of the various neurons. By way of example, the ANN could be configured to provide an output map—which then implements the error map or from which the error map can be derived—which indicates the position and the classification of the detected defects. Different neurons in the network can correspond to different entries in the output map.

However, in the process, the defect detection algorithm is not restricted to the use of an ANN in the various examples described herein. In further examples, it would also be possible for—as an alternative or in addition to an ANN—other types of defect detection algorithm to be used. Examples comprise, for instance, a threshold analysis of the digital contrast of the result images and a statistical analysis of the digital contrast. By way of example, the assumption could be made that defects have a particularly pronounced digital contrast; in this way, the defects can be segmented by means of the threshold analysis. Then, from the form of the segmentation, there could be an assignment to the predefined defect classes as a classification, for example. By way of example, statistical analysis could be used to determine the density of defects or an average distance between defects.

FIG. 11 illustrates aspects in respect of techniques for material testing.

Initially, the image capture takes place in block 1001. Raw data 800 are obtained from the image capture 1001. These raw data correspond to images 890, which are captured with different modalities and/or different poses of the test object 150 in relation to the optical apparatus 100.

By way of example, a plurality of Z-stacks 801 of images 890 could be captured in the example of FIG. 11, in each case for different wavelengths 802-1, 802-2. By way of example, the illumination geometry can be varied in the case of the angle-variable illumination or the filter pattern can be varied in the case of the angle-variable detection, in each case from Z-stack 801 to Z-stack 801 (at the same wavelength 802-1, 802-2). By way of example, in the example of FIG. 11, three respective images are captured at the same Z-position (same stack position in the Z-stack 801) for one wavelength 802-1, 802-2, in each case with a different angle of the angle-variable illumination/angle-variable detection.

As an alternative or in addition to the capture of Z-stacks 801, XY-stacks could be captured as well.

Then the image evaluation 1002 or image processing takes place. Now, result images 891 are obtained in addition to the raw data 800. The result images 891 are obtained by the suitable combination of the various images 890 of the raw data 800. Images 890 which have the same pose and the same imaging modality are combined in this case. By way of example, in the example of FIG. 11, the uppermost images (all at the same Z-position) could be respectively combined with one another for the first row of Z-stacks 801, which correspond to the wavelength of 802-1, in order to obtain a corresponding result image 891. As a result, a Z-stack 801 of result images 891 is obtained, respectively one for each imaging modality 802-1, 802-2.

Subsequently, the defect detection algorithm is applied, 1032. As a result, a Z-stack 801 of error maps 895 is obtained, respectively marking the defects 901-903 in different Z-planes.

FIG. 11 also illustrates that an ANN 950 can be used as a defect detection algorithm in block 1032. FIG. 11 illustrates that the ANN 950 comprises an input layer (far left) with a plurality of neurons, hidden layers and an output layer (far right) with a plurality of neurons.

By way of example, sliding windows could be used when applying the defect detection algorithm in block 1032 in order to supply the information of the result images 891 to the defect detection algorithm in sequence. This can allow the image field of the defect detection algorithm to be expanded. In particular, a number of pixels of the result image 891 can then be greater than a number of neurons of the ANN in the input layer.

The ANN 950 can be trained, in block 1052. To train the ANN 950, reference measurements can be taken for a large number of optical test objects and there can be a manual annotation of visible defects by experts in block 1051. Partly automated machine learning would also be conceivable. The training sets the connections in the various layers, i.e., e.g., appropriate weighting, etc.

Subsequently, the various defects 901-903 are measured in block 1061. This can correspond to a segmentation of the marked defects 901-903 in the various result images 891.

Moreover, there is a classification of the defects 901-903. By way of example, in the scenario of FIG. 11, the various defects 901-903 are assigned to different defect classes (illustrated by the different fill).

The defects 901-903, which are marked in the error maps 895, can also be registered in a global coordinate system; i.e., it is possible to determine the relative positioning of the various defects 901-903 in relation to one another or in relation to a reference point. To this end, it is possible, in block 1062, to take account of reference data which are obtained, for example, by a calibration measurement with a reference sample 910. The reference data can facilitate determination of the absolute size and/or relative positioning of the different defects 901-903 with respect to one another.

Then, in block 1034, there can be a comparison of the processed error maps 895 with a reference error map 896, which is derived from an industrial standard in the example of FIG. 11.

Finally, a quality value which corresponds to a compliance or non-compliance with an industrial standard in the example of FIG. 11 can be determined in block 1035. This can correspond to ascertaining the quality of the test object 150.

In the example of FIG. 11, the ANN 950 is trained on the basis of reference measurements. In general, it would be possible for repeated or continuous retraining of the ANN 950—or, in general, of defect detection algorithms using machine learning—to be carried out as an alternative or in addition to such reference measurements, By way of example, it is possible for the outputs of the ANN 950 or the result of the material testing during the running testing process to be checked repeatedly and for new reference measurements to be generated therefrom. This can be implemented in automated or at least partly monitored fashion. Using these newly generated reference measurements, retraining can occur on a regular basis or for certain events (new standard introduced, changes in the measurement setup, change of the test object). That is to say, in general, there can be retraining of the ANN on the basis of a result of the material testing. As a result, a continuous refinement or improvement of the detection accuracy of the ANN can be attained. In particular one (or both) of the two following objects can be achieved: (i) improvement in the metric applied to the ANN, e.g., accuracy of the segmentation, defect detection rate, number of false-positive/false-negative decisions, etc.; and/or (ii) learning newly occurred defect classes or adaptations to other changes in the testing process, e.g., relating to the test object, the image data, or the reference error map or the employed standard, etc.

Figure 12:
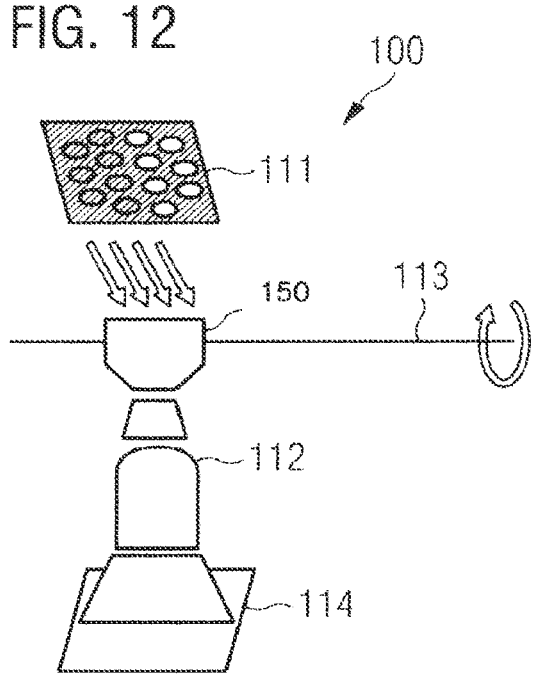
FIG. 12 schematically illustrates an optical imaging system in accordance with various examples.

FIG. 12 illustrates aspects in relation to the optical apparatus 100. In the example of FIG. 12, the optical apparatus 100 comprises an illumination module 111, which is configured for the angle-variable illumination of an optical test object 150. The sample holder 113 can vary the pose of the test object 150 in relation to the optical apparatus 100 by rotation. In the example of FIG. 12, imaging is implemented in transmitted-light geometry.

Figure 13:
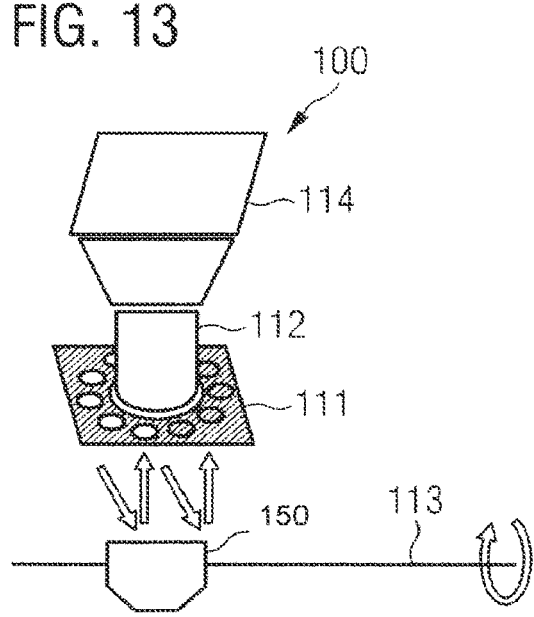
FIG. 13 schematically illustrates an optical imaging system in accordance with various examples.

FIG. 13 illustrates aspects in relation to the optical imaging system. FIG. 13 illustrates a further exemplary implementation of the imaging system 100. Here, as a matter of principle, the optical apparatus 100 in accordance with FIG. 13 is configured in accordance with the optical apparatus 100 in accordance with FIG. 12. However, in FIG. 13, imaging is implemented in reflected-light geometry. To this end, the illumination module 111 has a central cutout, through which light reflected at the test object 150 can reach the detector 114.

Figure 14:
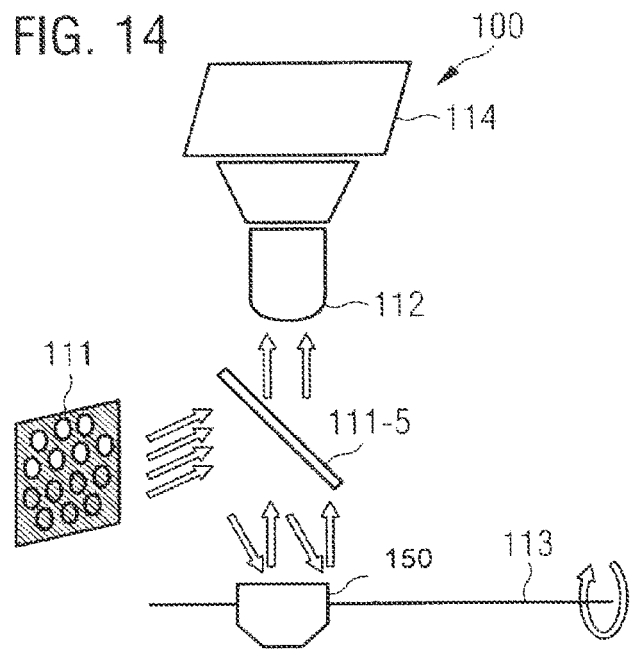
FIG. 14 schematically illustrates an optical imaging system in accordance with various examples.

FIG. 14 illustrates aspects in relation to the optical imaging system 100. The example in FIG. 14 corresponds, in principle, to the example in FIG. 13. However, in the example of FIG. 14, a beam splitter 111-5 is used—instead of a central cutout of the illumination module 111—for implementing the reflected-light geometry.

Figure 15:
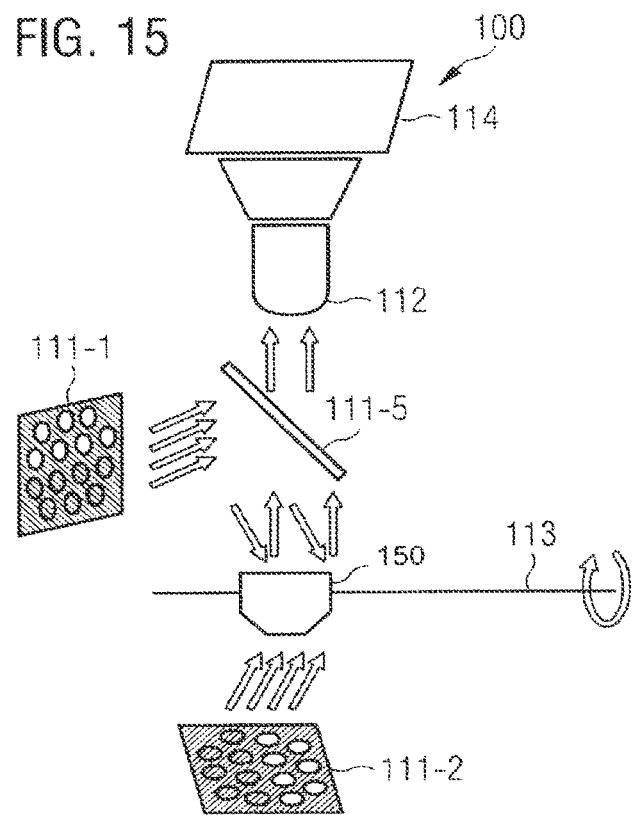
FIG. 15 schematically illustrates an optical imaging system in accordance with various examples.
Figure 16:
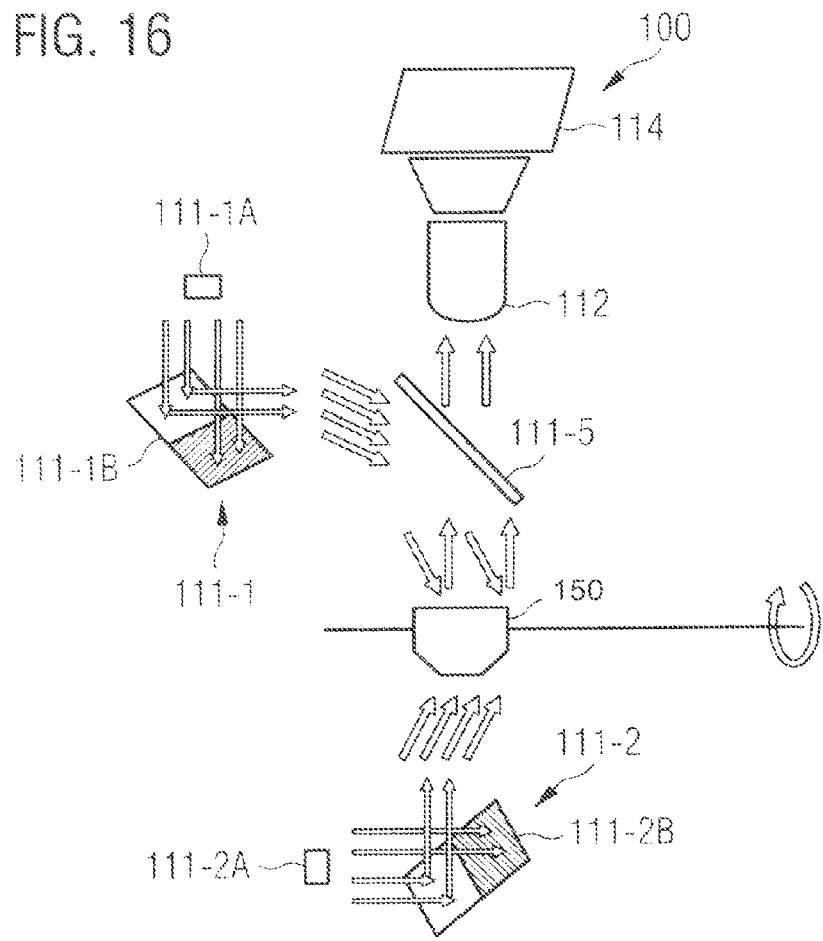
FIG. 16 schematically illustrates an optical imaging system in accordance with various examples.

FIG. 15 illustrates aspects in relation to the optical imaging system 100. Here, in principle, the example of FIG. 15 corresponds to the example of FIG. 14. However, in the example of FIG. 15, there are a plurality of illumination modules 111-1, 111-2, which are each configured for angle-variable illumination. Here, the illumination module 111-1 is configured for imaging in reflected-light geometry while the illumination module 111-2 is configured for imaging in transmitted-light geometry, FIG. 16 illustrates aspects in relation to the optical imaging system. The example in FIG. 16 corresponds here, in principle, to the example in FIG. 15. However, in the example of FIG. 16, the illumination modules 111-1, 111-2 are not implemented by an array of light-emitting diodes; instead, they are implemented by micromirror apparatuses or DMDs 111-1B, 111-2B, respectively in combination with a single light source 111-1A, 111-2A.

Figure 17:
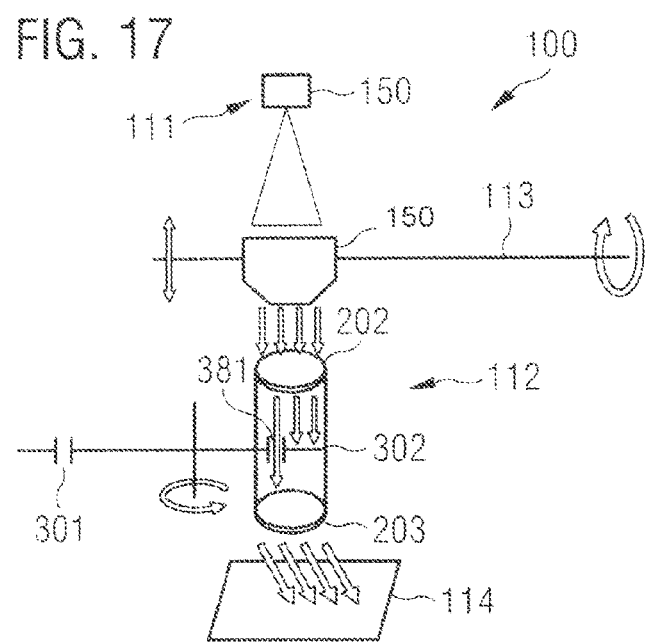
FIG. 17 schematically illustrates an optical imaging system in accordance with various examples.

FIG. 17 illustrates aspects in relation to the optical imaging system 100. In the example of FIG. 17, the illumination module 111 is not configured for angle-variable illumination and comprises merely a single light source 111-9. Once again, the sample holder 113 is configured for the rotation and Z-displacement of the optical test object 150. The detection optical unit 112 is configured for angle-variable detection. To this end, different filter patterns 380-1, 380-2 can be used in the region of a pupil plane for the purposes of filtering the spectrum of the beam path.

As a general rule, provision can be made for the use of a correction lens in the various examples described herein. The correction lens can be disposed upstream and downstream of the optical test object 150 in the beam path of the light from the illumination module 111 to the detector 114. By means of the correction lens, it may be possible to compensate an optical effect of the optical test object 150—which may implement a lens, for example. To this end, the correction lens can have optical effect that is complementary to that of the optical test object. As a result, it is possible to correct falsifications on account of the refractive power of the optical test object 15. This renders it possible to reduce falsifications in the images and result images on account of the optical effect of the test object.

In conclusion, techniques were described above, by means of which fully automated material testing is facilitated by assessing the quality of optical test objects. A classification in conjunction with an industrial standard is facilitated. The techniques described herein facilitate a particularly high sensitivity of the material testing by using a tailored digital contrast. In turn, this facilitates fewer production rejects since certain tolerances during the testing can be dimensioned to be comparatively small. Moreover, the material testing can be carried out at a high speed.

By way of example, techniques have been described, which facilitate a testing process as follows: (i) applying a defect detection algorithm for quantifying features of individual defects, i.e., for example, the relative position, form, size, and/or optical effect of the defects; (ii) quantifying the overall influence of all errors on the optical effect; i.e., the aggregated influence of all detected effects on the optical effect can be determined; (iii) assigning the test object to one of a plurality of predefined result classes—e.g., "within tolerance"/"outside of tolerance" in respect of a suitable standard or another specification. This means that a quality value can be determined. By way of example, this assignment of the test object can resort to an error map, in which the information of (i) and (ii) is stored. (iv) optionally displaying the result image on a monitor, e.g., together with an indication of defects on the basis of an error map of the defect detection algorithm.

In some examples, it is possible for (i) and (ii) to be carried out by separate algorithms. By way of example, a defect detection algorithm could be applied first for carrying out (i); then, following (ii), an output of the defect detection algorithm could be compared to a reference error map. On the basis of the comparison, for example on the basis of a deviation between an error map as an output of the defect detection algorithm and the reference error map, compliance with the standard (iii) can then be checked. However, in other examples, it would also be possible for (i) and (ii) to be mapped in combination by an ANN or other techniques of machine learning; information about individual defects, for instance a corresponding segmentation, can then be dispensed with in such implementations. Sometimes, it might even be possible for (i), (ii), and (iii) to be implemented in combination by a common ANN or other techniques of machine learning; such an ANN can obtain one or more of the result images as an input map and can have an output map with two or three neurons, which correspond to "within the tolerance", "outside of the tolerance" and, optionally, "uncertain". The techniques described herein are able to be integrated into a production process. By way of example, an optical imaging system, as described above, could be equipped with an optical test object by a robotic arm; then, the techniques described herein can be carried out.

Using the techniques described herein, it is also possible to detect defects with a variable Z-position within the optical test object. This can be implemented by setting the focal position of the optical test object. Z-stacks of images can be captured. In general, the pose of the optical test object can be varied in relation to the optical imaging system.

As described above, the material testing can be implemented in automated fashion. In so doing, use can be made of algorithms with machine learning, for example as a defect detection algorithm or else in any other form.

In this context, use can be made of reference implementations of algorithms with machine learning, which are known in advance. In this case, it may be possible to adapt such reference implementations of algorithms of machine learning in order to process raw images captured by means of angle-variable illumination and/or angle-variable detection and/or corresponding result images, which are obtained from the raw images, particularly well. A few corresponding examples are specified below.

By way of example, it would be possible to normalize the raw images and/or the result images. Such techniques of normalization are based on the discovery that—depending on the implementation of the angle-variable illumination and the processing of the raw images—different digital contrasts may be contained in the result images. The signal level of pixel values can vary significantly depending on the digital contrast. It was also determined that different locations on the test object can have significantly different signal levels of the pixel values on account of the material properties of the test object. Examples of normalization techniques comprise instance or batch normalization.

In a further example, the image field of the algorithm with machine learning can be expanded, for instance by a parallel atrous convolution and a normal convolution. In this way, size-limited inputs of algorithms for machine learning can be adapted to the comparatively extensive raw images and/or result images. By way of example, corresponding techniques are described in Chen, Liang-Chieh, et al. "Deeplab: Semantic image segmentation with deep convolutional nets, atrous convolution, and fully connected crfs." IEEE transactions on pattern analysis and machine intelligence 40.4 (2018): 834-848.

In a further example, it is possible that the input of the algorithm with machine learning includes a sequence of sliding windows. Here, different windows of the sequence can map different regions of the at least one result image, with or without overlap. Then, it is possible that the output of the algorithm is determined from a combination of the results of a sequence of results. Here, the sequence of results can correspond to the sequence of sliding windows. Such a technique enables the image field of the algorithm to be expanded.

For instance, a CNN called "U-net" can be used as an example of an ANN; see Ronneberger, Olaf, Philipp Fischer, and Thomas Brox. "U-net: Convolutional networks for biomedical image segmentation." International Conference on Medical image computing and computer-assisted intervention. Springer, Cham, 2015. Such a U-net CNN can be modified by the use of skip connections in order to maintain a high local resolution of the model predictions by means of segmentation. Such techniques are described in, for example, Isola, Phillip, et al. "Image-to-image translation with conditional adversarial networks." arXiv preprint (2017).

In one example, it may be possible to provide multi-modal inputs into an algorithm for machine learning. By way of example, each raw image and/or each result image with a digital contrast could be considered a separate channel. Such a multi-modal input can differ from a conventional "3-channel red/green/blue" input: The object lies in common processing of all available image information, i.e., result images and/or raw images. Such common processing can be achieved, for example, by direct concatenation of all channels. However, as an alternative or in addition thereto, it would also be possible to take account of a concatenation of the results of preprocessing that is individually learnable for each channel. This means that, in such a case, specific preprocessing can occur for each channel in the first layers of the ANN before the concatenation of the channels is carried out.

It goes without saying that the features of the embodiments and aspects of the invention described above can be combined with one another. In particular, the features can be used not only in the combinations described but also in other combinations or on their own without departing from the scope of the invention.

By way of example, techniques were described above which are based on the use of an ANN as a defect detection algorithm. In general, use can also be made of other types of defect detection algorithm; in particular, it is possible to use defect detection algorithms which, in general, are based on techniques of machine learning. The techniques described in conjunction with the use of an ANN can also be applied to other techniques of machine learning.

Further, techniques using an ANN were described above. In general, use can also be made of other algorithms with machine learning, e.g., parametric mapping or a generative model.

What is claimed:

1. A method for material testing of an optical test object using an optical imaging system, wherein the method comprises:
    for each of at least one pose of the test object in relation to the optical imaging system: respectively actuating the optical imaging system at least two images of the test object by means of at least one of angle-variable illumination and angle-variable detection,
    for each of the at least one pose: respectively processing the corresponding at least two images to generate at least one result image with a digital contrast, and
    on the basis of the at least one result image which was generated on the basis of the at least two images for the at least one pose: carrying out material testing of the test object,
    wherein carrying out the material testing comprises the application of a defect detection algorithm for automatically detecting defects,
    wherein, for a detected defect, the defect detection algorithm determines a corresponding influence of the respective defect on an optical effect of the test object,
    wherein the test object is at least partly transparent to visible light or infrared light or ultraviolet light.

2. The method as claimed 1, wherein, for a detected defect, the defect detection algorithm provides at least one of a corresponding segmentation of the respective result image and a corresponding classification of the respective defect in relation to predefined defect classes.

3. The method as claimed in claim 1, wherein the defect detection algorithm determines an aggregated influence on the optical effect of the test object for a plurality of detected defects.

4. The method as claimed in claim 1, wherein the defect detection algorithm comprises a trained artificial neural network, which is configured to receive one or more of the at least one result image as input map.

5. The method as claimed in claim 4,
    wherein the artificial neural network is configured to provide an output map which indicates a position and a classification of the defects detected.

6. The method as claimed in claim 4, furthermore comprising:
    carrying out retraining of the artificial neural network on the basis of a result of the material testing.

7. The method as claimed in claim 1, wherein the defect detection algorithm comprises at least one of a threshold analysis of the digital contrast of the at least one result image and a statistical analysis of the digital contrast.

8. The method as claimed in claim 1, wherein the defect detection algorithm comprises an anomaly detector, which detects defects of a priori unknown defect classes.

9. The method as claimed in claim 1, wherein the detected defects are marked in at least one error map, wherein the method furthermore comprises:
    comparing the at least one error map with a reference error map and
    determining a quality value of the material testing on the basis of the comparison.

10. The method as claimed in claim 9,
    wherein the at least one pose comprises a plurality of poses which are associated with a plurality of result images,
    wherein the defect detection algorithm is respectively applied to each of the plurality of result images to obtain a respective error map,
    wherein the method furthermore comprises:
        registering defects marked in the error maps in a global coordinate system,
    wherein the registered error maps are compared to the reference error map.

11. The method as claimed in claim 9,
    wherein the at least one pose comprises a plurality of poses which are associated with a plurality of result images,
    wherein the method furthermore comprises:
        registering the plurality of result images in a global coordinate system,
    wherein the defect detection algorithm is coherently applied to the registered result images for the purposes of detecting 3D defects.

12. The method as claimed in claim 1,
    wherein carrying out the material testing comprises the application of an algorithm with machine learning,
    wherein the algorithm with machine learning is configured to receive the at least one result image as input and to provide a quality value of the test object as output.

13. A method for material testing of an optical test object using an optical imaging system, wherein the method comprises:
    for each of at least one pose of the test object in relation to the optical imaging system: respectively actuating the optical imaging system at least two images of the test object by means of at least one of angle-variable illumination and angle-variable detection,
    for each of the at least one pose: respectively processing the corresponding at least two images to generate at least one result image with a digital contrast, and
    on the basis of the at least one result image which was generated on the basis of the at least two images for the at least one pose: carrying out material testing of the test object,
    wherein carrying out the material testing comprises the application of an algorithm with machine learning,
    wherein the algorithm with machine learning is configured to receive the at least one result image as input and to provide a quality value of the test object as output,
    wherein the input of the algorithm with machine learning comprises a sequence of sliding windows, wherein the sliding windows of the sequence of sliding windows image different regions of the at least one result image,
    wherein the output of the algorithm with machine learning is determined on the basis of a combination of results of a sequence of results of the algorithm with machine learning,
    wherein the sequence of results corresponds to the sequence of sliding windows.

14. The method as claimed in claim 1, furthermore comprising:
    for each of the at least one pose: varying at least one imaging modality when capturing the at least two images,
    wherein the at least one imaging modality is selected from the following group: color of the light used; polarization of the light used; magnitude of the at least one of angle-variable illumination and angle-variable detection; orientation of the at least one of angle-variable illumination and angle-variable detection.

15. The method as claimed in claim 1,
wherein the digital contrast is selected from the group of: virtual dark field; digital phase gradient contrast; and digital phase contrast.

16. A method for material testing of an optical test object using an optical imaging system, wherein the method comprises:
for each of at least one pose of the test object in relation to the optical imaging system: respectively actuating the optical imaging system at least two images of the test object by means of at least one of angle-variable illumination and angle-variable detection,
for each of the at least one pose: respectively processing the corresponding at least two images to generate at least one result image with a digital contrast, and
on the basis of the at least one result image which was generated on the basis of the at least two images for the at least one pose: carrying out material testing of the test object,
wherein the optical imaging system furthermore comprises a correction lens which has an optical effect that is complementary to an optical effect of the test object.

17. A method for material testing of an optical test object using an optical imaging system, wherein the method comprises:
for each of at least one pose of the test object in relation to the optical imaging system: respectively actuating the optical imaging system at least two images of the test object by means of at least one of angle-variable illumination and angle-variable detection,
for each of the at least one pose: respectively processing the corresponding at least two images to generate at least one result image with a digital contrast, and
on the basis of the at least one result image which was generated on the basis of the at least two images for the at least one pose: carrying out material testing of the test object,
wherein the at least one pose comprises a plurality of poses,
wherein the plurality of poses define a z-stack and/or an xy-stack.

18. A computing unit, which is configured to:
actuate an optical imaging system in order to capture, by means of at least one of angle-variable illumination and angle-variable detection, at least two respective images of a test object for each of at least one pose of said optical test object in relation to the imaging system, the test object is at least partly transparent to visible light or infrared light or ultraviolet light
for each of the at least one pose: respectively process the corresponding at least two images to generate at least one result image with a digital contrast, and
on the basis of the at least one result image which was generated on the basis of the at least two images for the at least one pose: carry out material testing of the test object,
wherein the material testing of the test object is configured to apply a defect detection algorithm for automatically detecting defects, and
for a detected defect, the defect detection algorithm is configured to determine a corresponding influence of the respective defect on an optical effect of the test object.

19. The computing unit as claimed in claim 18,
wherein the computing unit is configured to perform material testing of said optical test object using said optical imaging system, wherein:
for each of at least one pose of the test object in relation to the optical imaging system: respectively actuating the optical imaging system to capture at least two images of the test object by means of at least one of angle-variable illumination and angle-variable detection,
for each of the at least one pose: respectively processing the corresponding at least two images to generate a result image with a digital contrast, and
on the basis of the at least one result image which was generated on the basis of the at least two images for the at least one pose: carrying out material testing of the test object.

20. A computing unit, which is configured to:
actuate an optical imaging system in order to capture, by means of at least one of angle-variable illumination and angle-variable detection, at least two respective images of a test object for each of at least one pose of said optical test object in relation to the imaging system,
for each of the at least one pose: respectively process the corresponding at least two images to generate at least one result image with a digital contrast, and
on the basis of the at least one result image which was generated on the basis of the at least two images for the at least one pose: carry out material testing of the test object,
wherein the material testing is configured to apply an algorithm with machine learning configured to receive the at least one result image as input and to provide a quality value of the test object as output,
wherein the input of the algorithm with machine learning comprises a sequence of sliding windows, wherein the sliding windows of the sequence of sliding windows image different regions of the at least one result image,
wherein the output of the algorithm with machine learning is configured to determine on the basis of a combination of results of a sequence of results of the algorithm with machine learning,
wherein the sequence of results corresponds to the sequence of sliding windows.

21. A computing unit, which is configured to:
actuate an optical imaging system in order to capture, by means of at least one of angle-variable illumination and angle-variable detection, at least two respective images of a test object for each of at least one pose of said optical test object in relation to the imaging system,
for each of at the least one pose: respectively process the corresponding at least two images to generate at least one result image with a digital contrast, and
on the basis of the at least one result image which was generated on the basis of the at least two images for the at least one pose: carry out material testing of the test object,
wherein the optical imaging system comprises a correction lens which has an optical effect that is complementary to an optical effect of the test object.

22. A computing unit, which is configured to:
actuate an optical imaging system in order to capture, by means of at least one of angle-variable illumination and angle-variable detection, at least two respective images of a test object for each of at least one pose of said optical test object in relation to the imaging system,
for each of the at least one pose: respectively process the corresponding at least two images to generate at least one result image with a digital contrast, and on the basis of the at least one result image which was generated on the basis of the at least two images for the at least one pose: carry out material testing of the test object,
wherein the at least one pose comprises a plurality of poses,
wherein the plurality of poses define a z-stack and/or an xy-stack.

\* \* \* \* \*

UNITED STATES PATENT AND TRADEMARK OFFICE
CERTIFICATE OF CORRECTION

PATENT NO. : 11,790,510 B2  
APPLICATION NO. : 17/251415  
DATED : October 17, 2023  
INVENTOR(S) : Stoppe et al.

It is certified that error appears in the above-identified patent and that said Letters Patent is hereby corrected as shown below:

In the Specification

1) Column 1, Line 20 -- "by experts," should be "by experts."

2) Column 1, Line 27 -- "(2305):375-388." should be "(2006):375-388."

3) Column 1, Line 40 -- the header "BRIEF SUMMARY OF THE INVENTION" should be "SUMMARY OF THE INVENTION"

4) Column 5, formula (1) -- the formula should read as follows: " $\mathcal{F}^{-1}\left\{\dfrac{\sum_j H_j^*(u)\cdot \tilde{I}_{DPC,j}(u)}{\sum_j |H_j(u)|^2 + \alpha}\right\}$ ,"

5) Column 9, Lines 56-57 -- "autofocus application," should be "autofocus application."

6) Column 10, Line 3 -- "unit 501," should be "unit 501."

7) Column 10, Lines 32-33 -- "(lateral plane; space domain coordinates y)." should be "(lateral plane; space domain coordinates x, y)."

8) Column 10, Line 46 -- "The SLIM" should be "The SLM"

9) Column 13, Line 13 -- "varied;" should be "varied,"

10) Column 17, Line 18 -- "in the i-direction" should be "in the Z-direction"

11) Column 17, Line 37 -- "block 1333" should be "block 1033"

12) Column 17, Line 51 -- "certain defect," should be "certain defects."

Signed and Sealed this  
Thirteenth Day of February, 2024

Katherine Kelly Vidal  
*Director of the United States Patent and Trademark Office*

CERTIFICATE OF CORRECTION (continued)
U.S. Pat. No. 11,790,510 B2

13) Column 12, Line 42 -- "into one another by way, of translation" should be "into one another by way of translation"

14) Column 21, Line 35 -- "reference measurements, By way of" should be "reference measurements. By way of"

In the Claims

15) Column 25, Claim 2 at Line 30 -- "The method as claimed 1," should be "The method as claimed in claim 1,"

16) Column 25, Claim 3 at Line 35 -- "The method as claimed 1," should be "The method as claimed in claim 1,"

17) Column 25, Claim 4 at Line 38 -- "The method as claimed 1," should be "The method as claimed in claim 1,"

18) Column 25, Claim 7 at Line 50 -- "The method as claimed 1," should be "The method as claimed in claim 1,"

19) Column 25, Claim 8 at Line 54 -- "The method as claimed 1," should be "The method as claimed in claim 1,"

20) Column 25, Claim 9 at Line 57 -- "The method as claimed 1," should be "The method as claimed in claim 1,"